(12) United States Patent
Kawakami et al.

(10) Patent No.: US 10,681,524 B2
(45) Date of Patent: Jun. 9, 2020

(54) WIRELESS COMMUNICATION DEVICE AND WIRELESS COMMUNICATION METHOD

(71) Applicant: SONY CORPORATION, Tokyo (JP)

(72) Inventors: Daisuke Kawakami, Kanagawa (JP); Kimiya Kato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 171 days.

(21) Appl. No.: 15/102,578

(22) PCT Filed: Nov. 14, 2014

(86) PCT No.: PCT/JP2014/005737
§ 371 (c)(1),
(2) Date: Jun. 8, 2016

(87) PCT Pub. No.: WO2015/092970
PCT Pub. Date: Jun. 25, 2015

(65) Prior Publication Data
US 2016/0316353 A1  Oct. 27, 2016

(30) Foreign Application Priority Data
Dec. 19, 2013 (JP) ................. 2013-263105

(51) Int. Cl.
*H04L 12/28* (2006.01)
*H04W 8/00* (2009.01)
*H04W 76/14* (2018.01)
*H04W 4/80* (2018.01)
*H04L 29/12* (2006.01)
*H04L 29/06* (2006.01)
*H04W 12/00* (2009.01)
*H04L 29/08* (2006.01)
*H04W 12/04* (2009.01)
*H04W 88/06* (2009.01)
*H04W 84/12* (2009.01)

(52) U.S. Cl.
CPC ......... *H04W 8/005* (2013.01); *H04L 61/2007* (2013.01); *H04L 61/2069* (2013.01); *H04L 61/6077* (2013.01); *H04L 63/061* (2013.01); *H04L 63/18* (2013.01); *H04L 67/1053* (2013.01); *H04W 4/80* (2018.02); *H04W 12/003* (2019.01); *H04W 12/04* (2013.01); *H04W 76/14* (2018.02); *H04W 84/12* (2013.01); *H04W 88/06* (2013.01)

(58) Field of Classification Search
CPC ..... H04W 76/14; H04W 84/12; H04W 88/06; H04L 61/2069; H04L 61/2007; H04L 61/6077; H04L 63/18; H04L 63/061
See application file for complete search history.

(56) References Cited

FOREIGN PATENT DOCUMENTS

| | | |
|---|---|---|
| CA | 2865738 A | 10/2013 |
| CN | 103369454 A | 10/2013 |
| JP | 2010-245748 A | 10/2010 |
| NO | 2013/153925 A | 10/2013 |

*Primary Examiner* — Bo Hui A Zhu
(74) *Attorney, Agent, or Firm* — Chip Law Group

(57) ABSTRACT

An electronic device that transmits, via a first communication interface to another electronic device, an IP (Internet Protocol) address; and communicates with the another electronic device via a second communication interface in accordance with the IP address.

27 Claims, 19 Drawing Sheets

[Fig. 1]
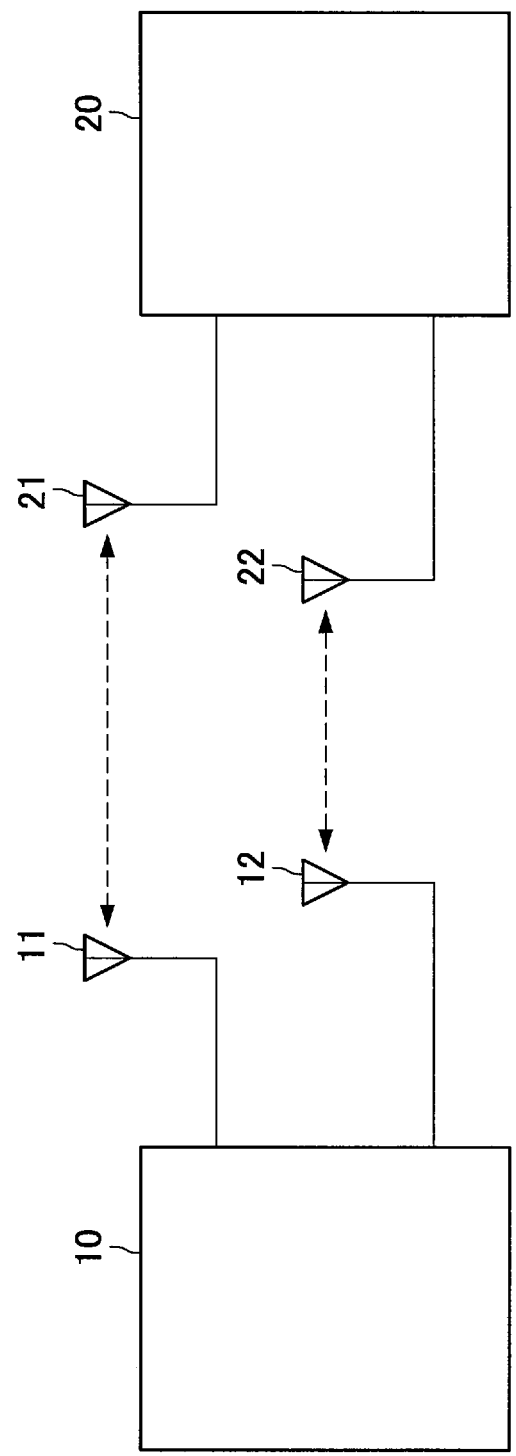

[Fig. 2]
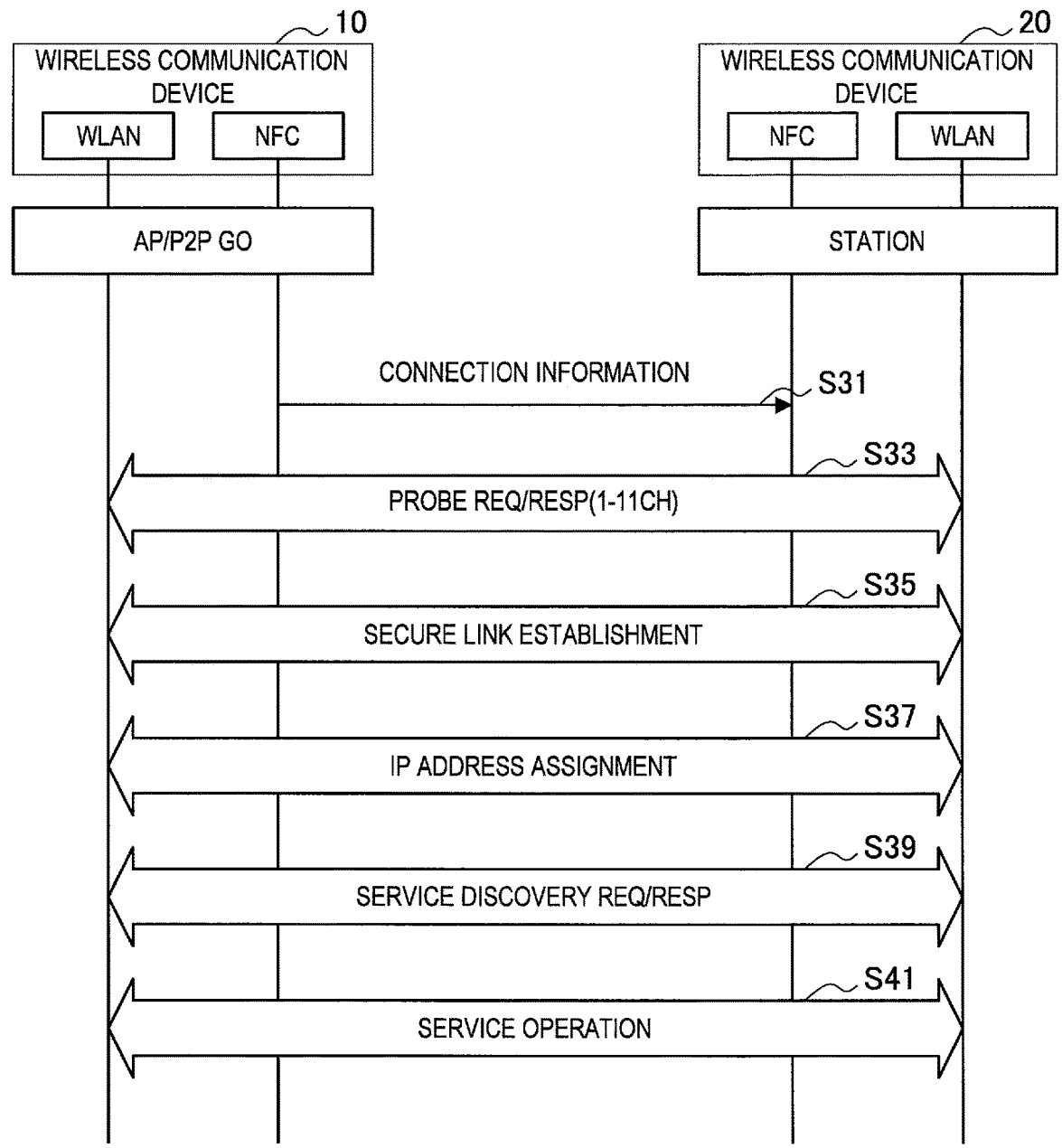

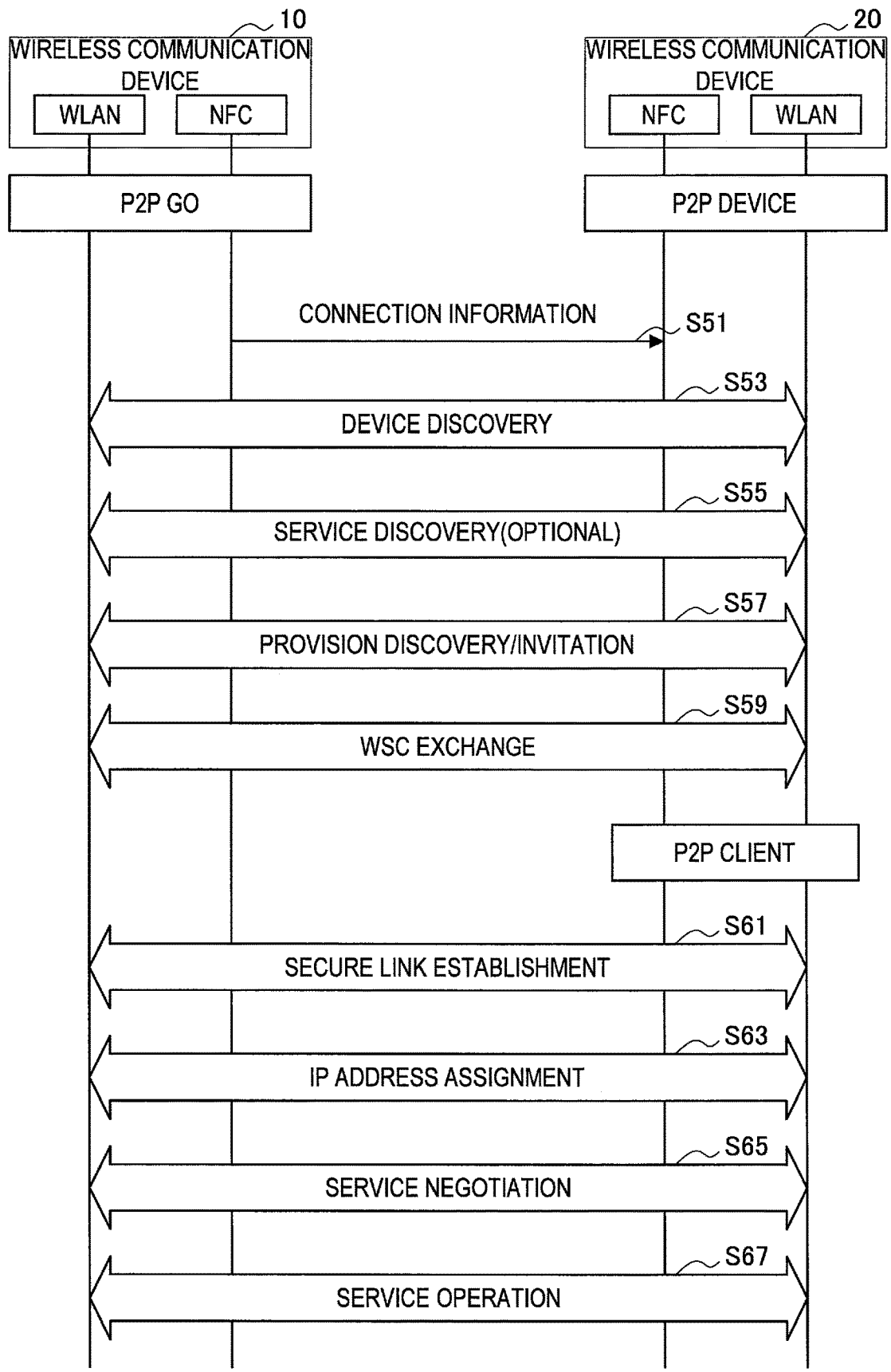

[Fig. 4]
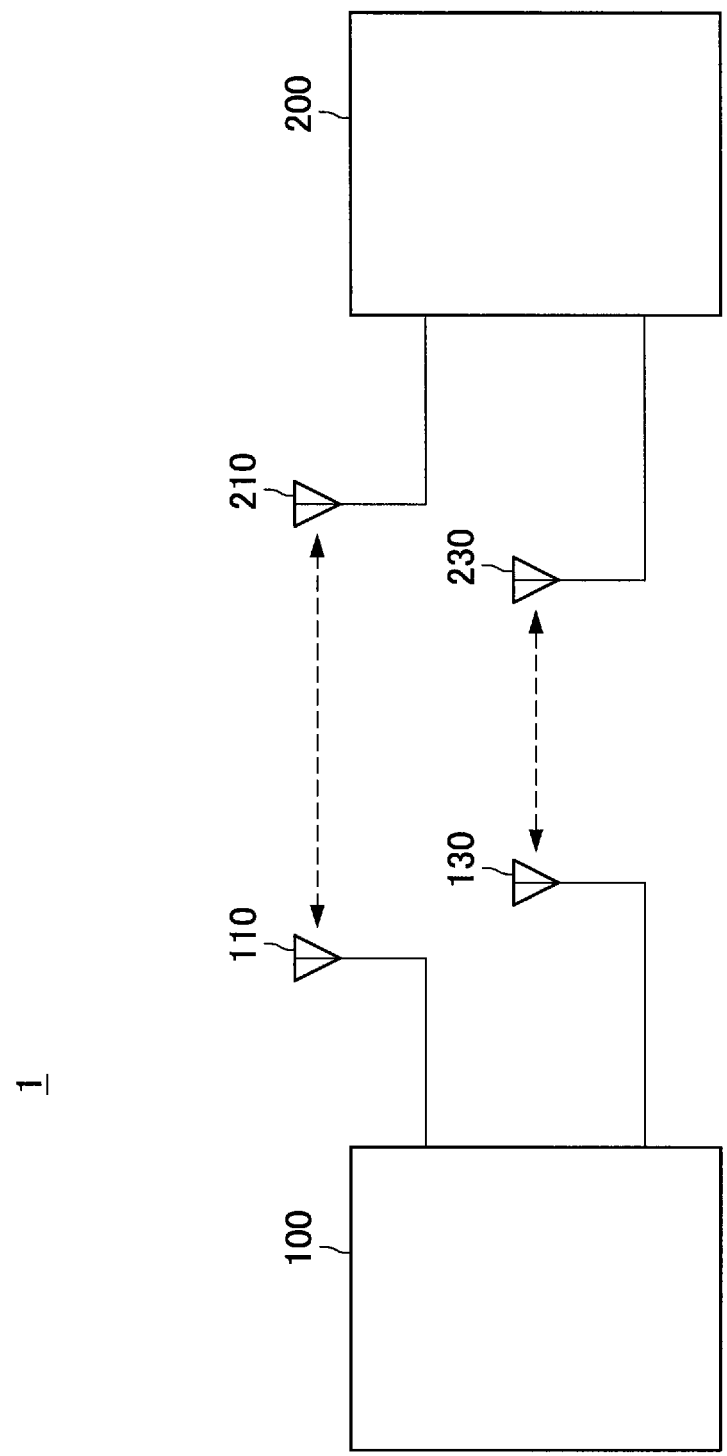

[Fig. 5]
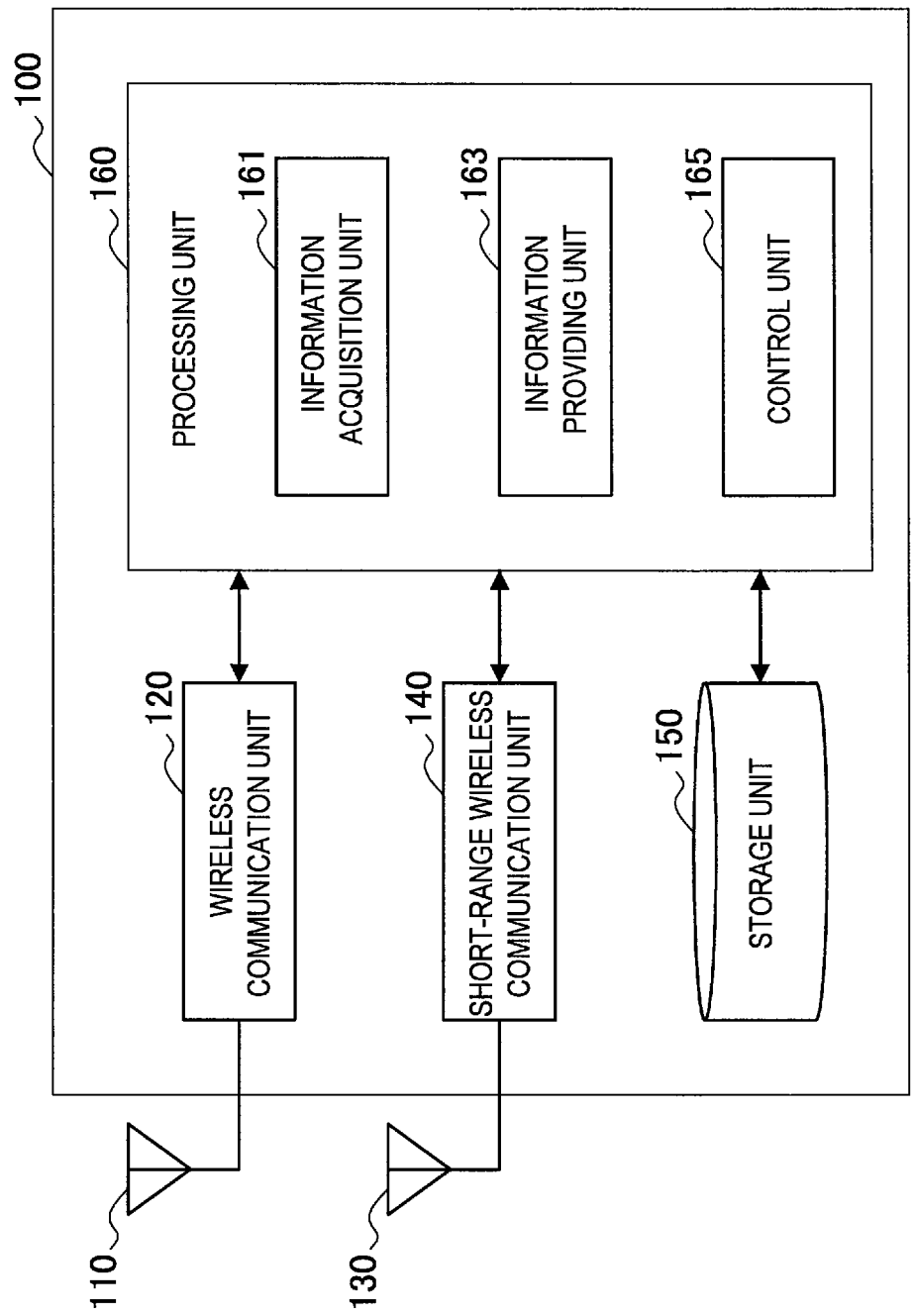

[Fig. 6]
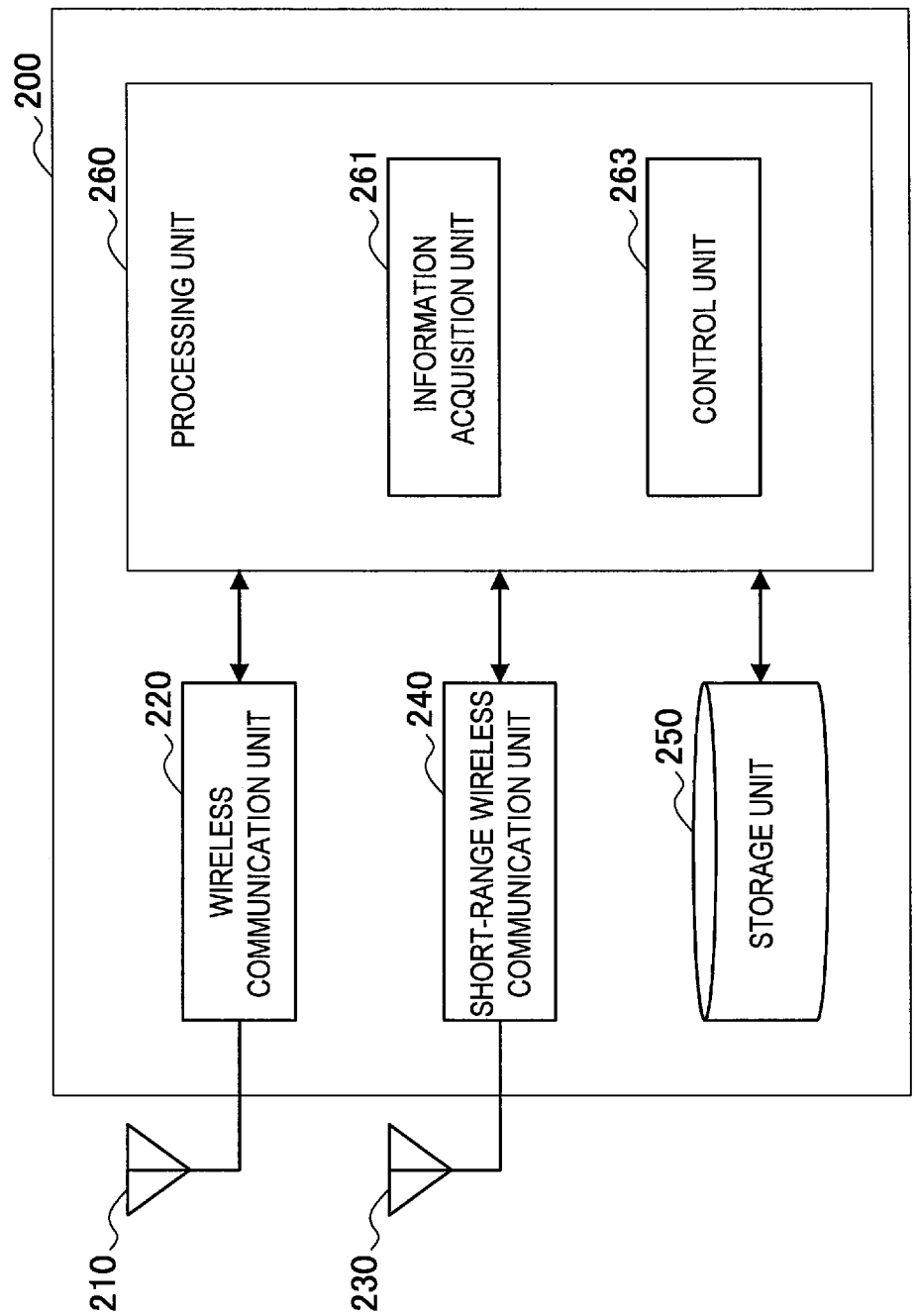

[Fig. 7]
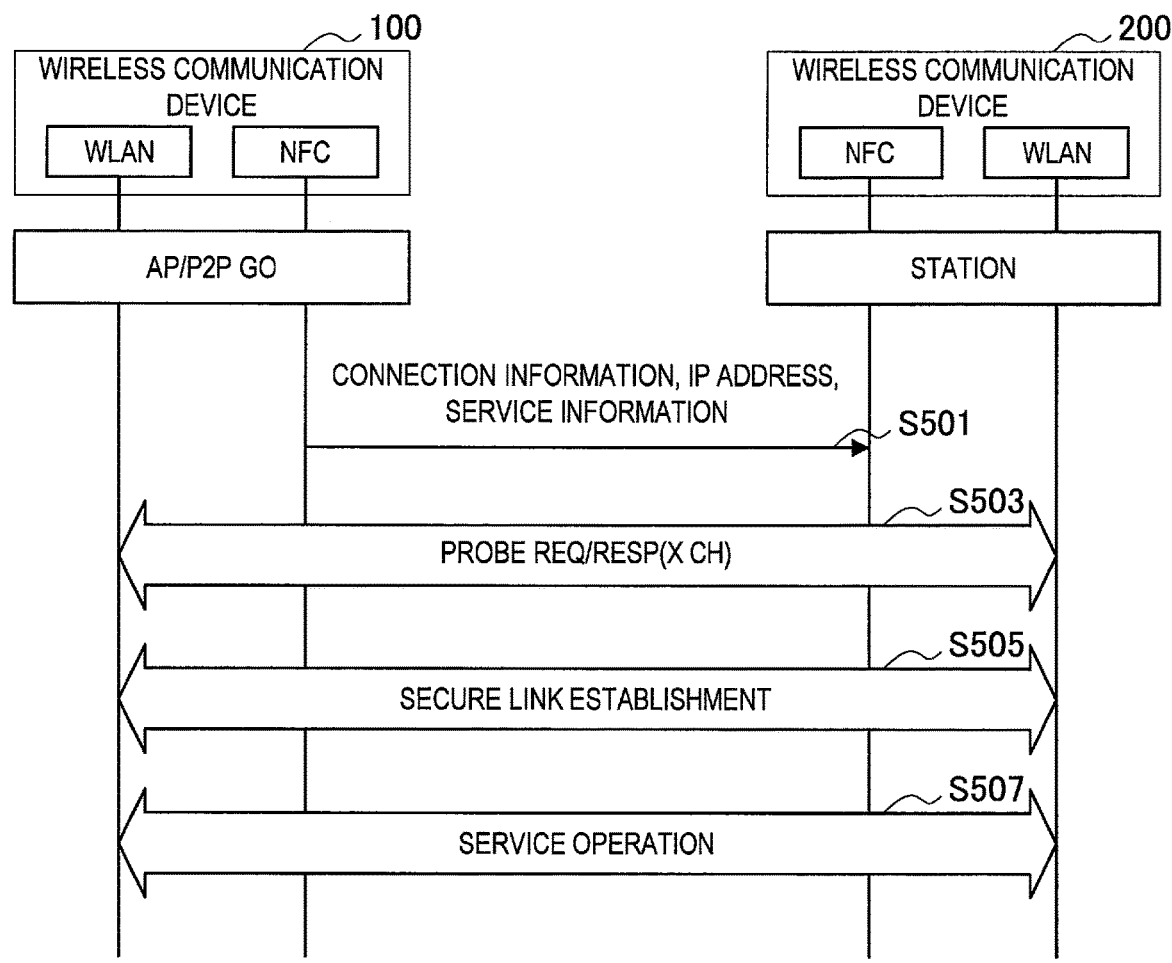

[Fig. 8]
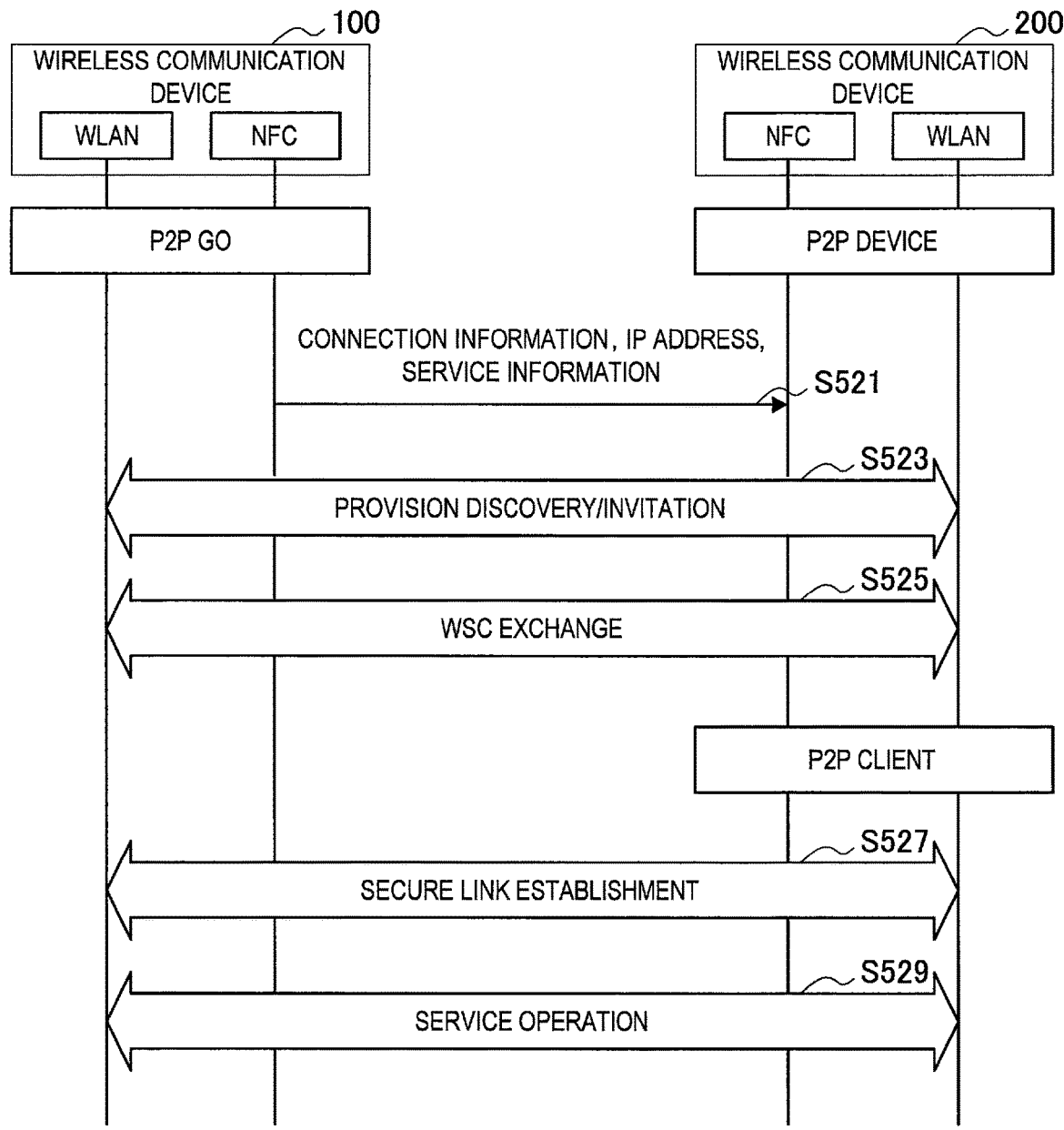
[Fig. 9]

[Fig. 10]
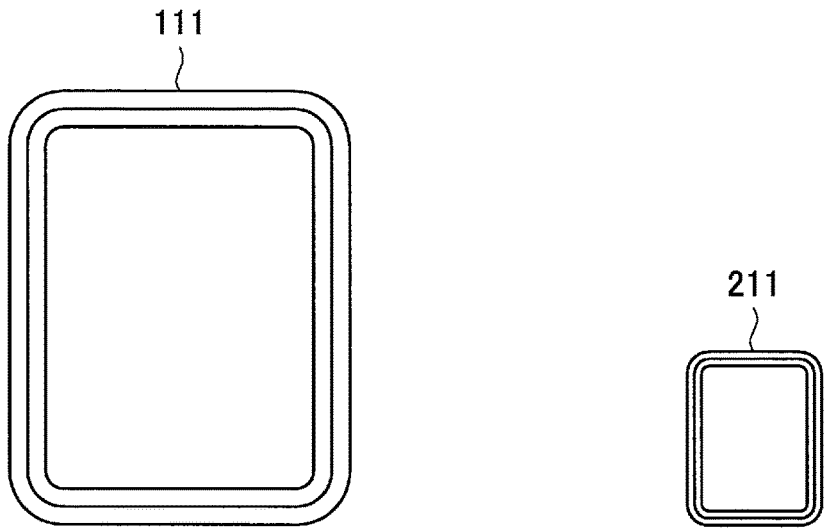
[Fig. 11]
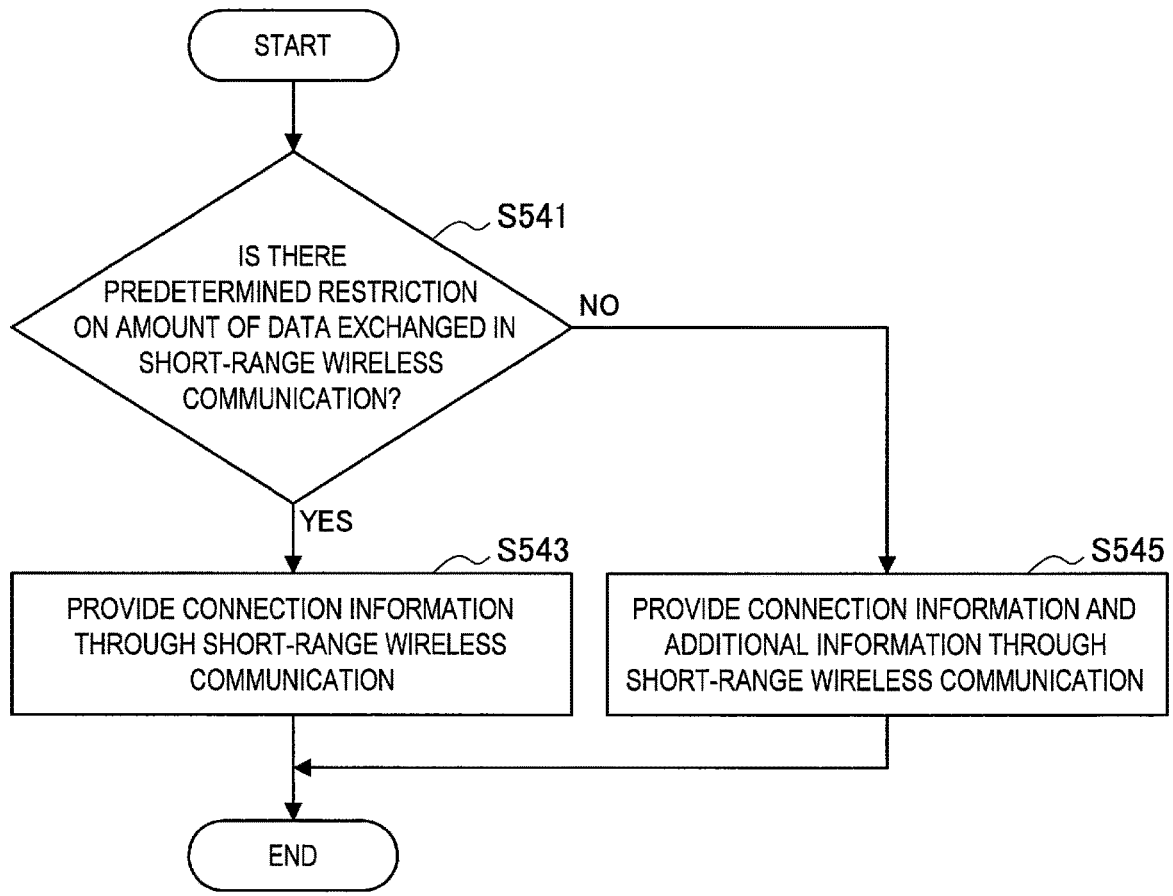

[Fig. 12]
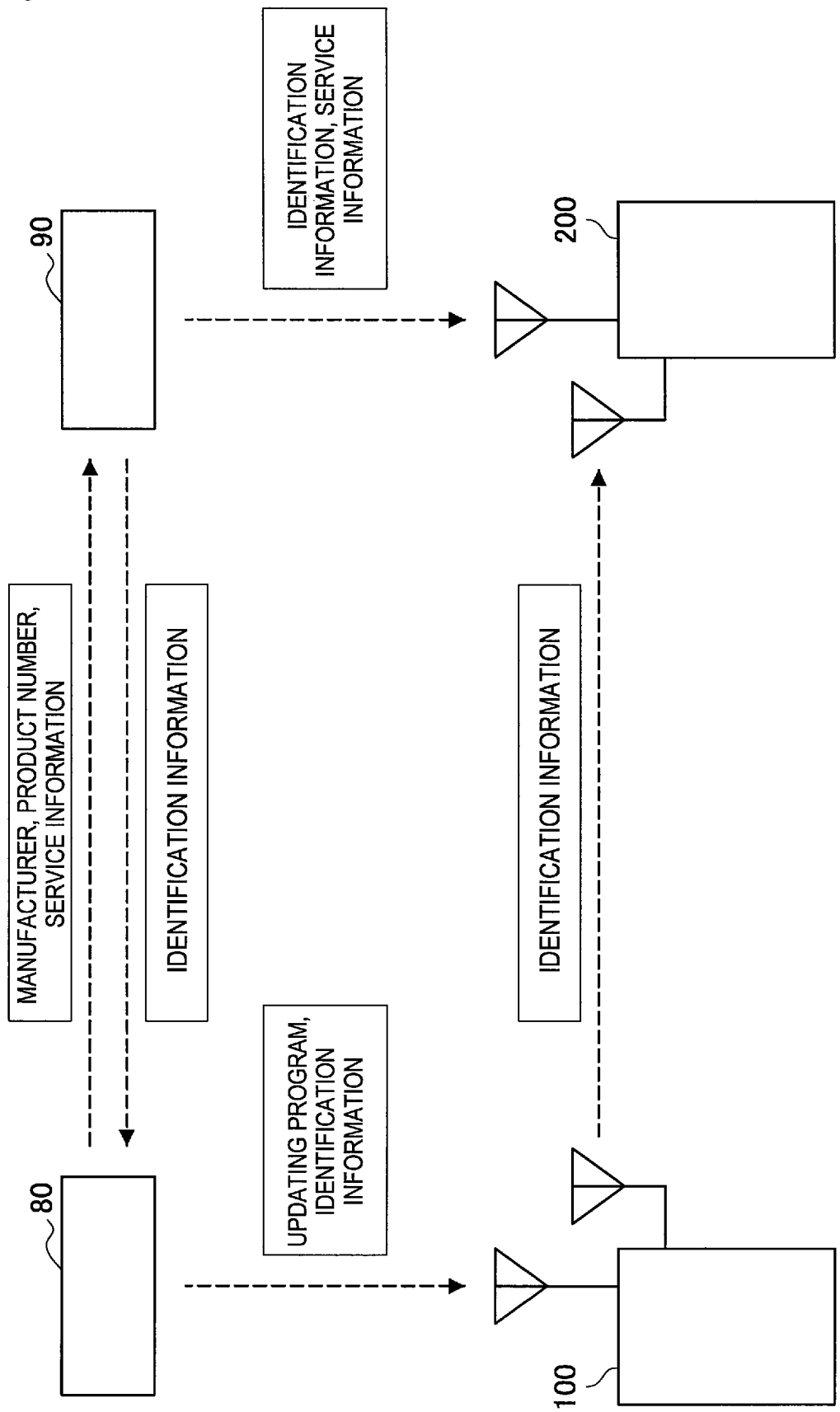

[Fig. 13]
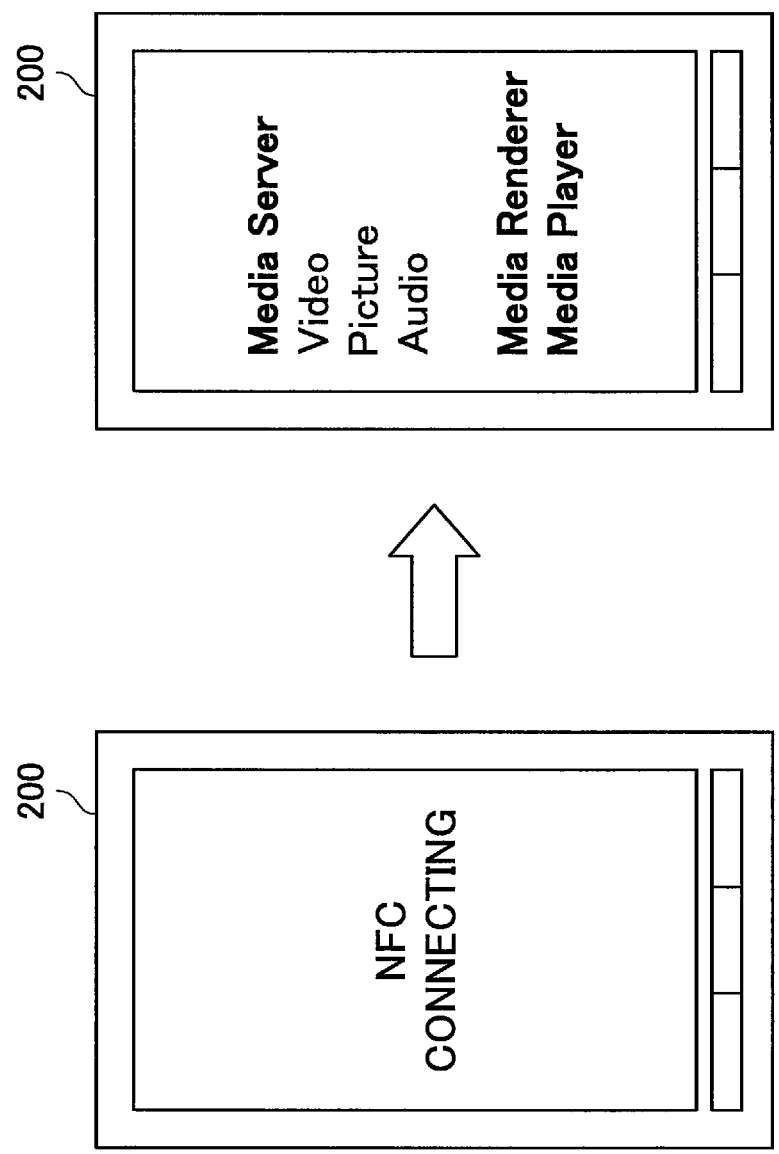

[Fig. 14]
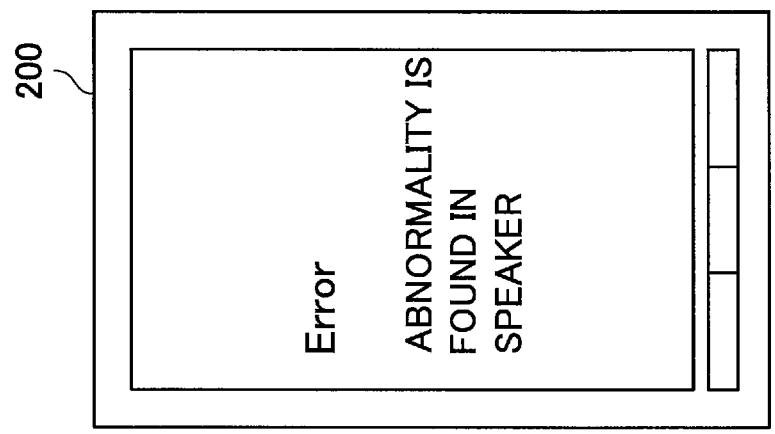
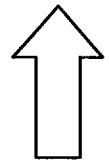
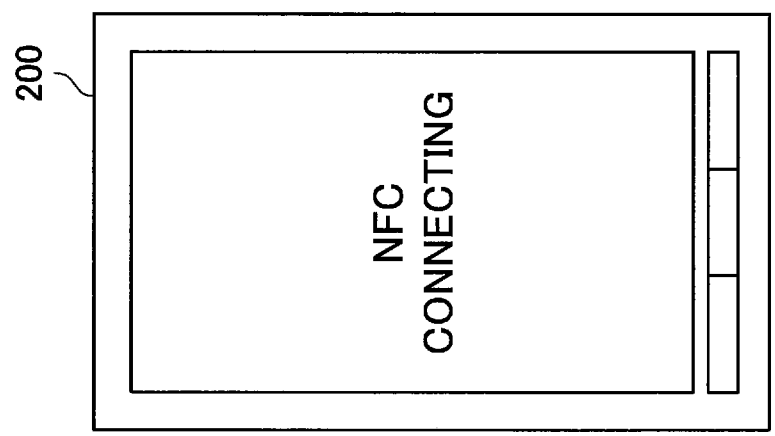

[Fig. 15]
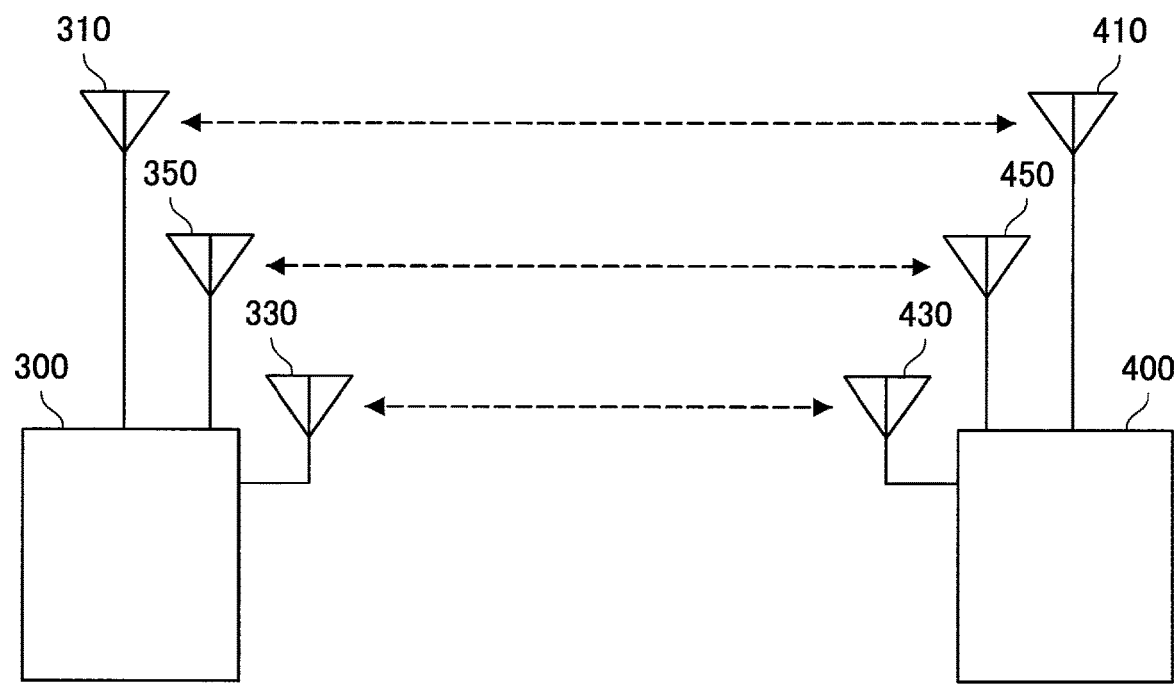

[Fig. 16]
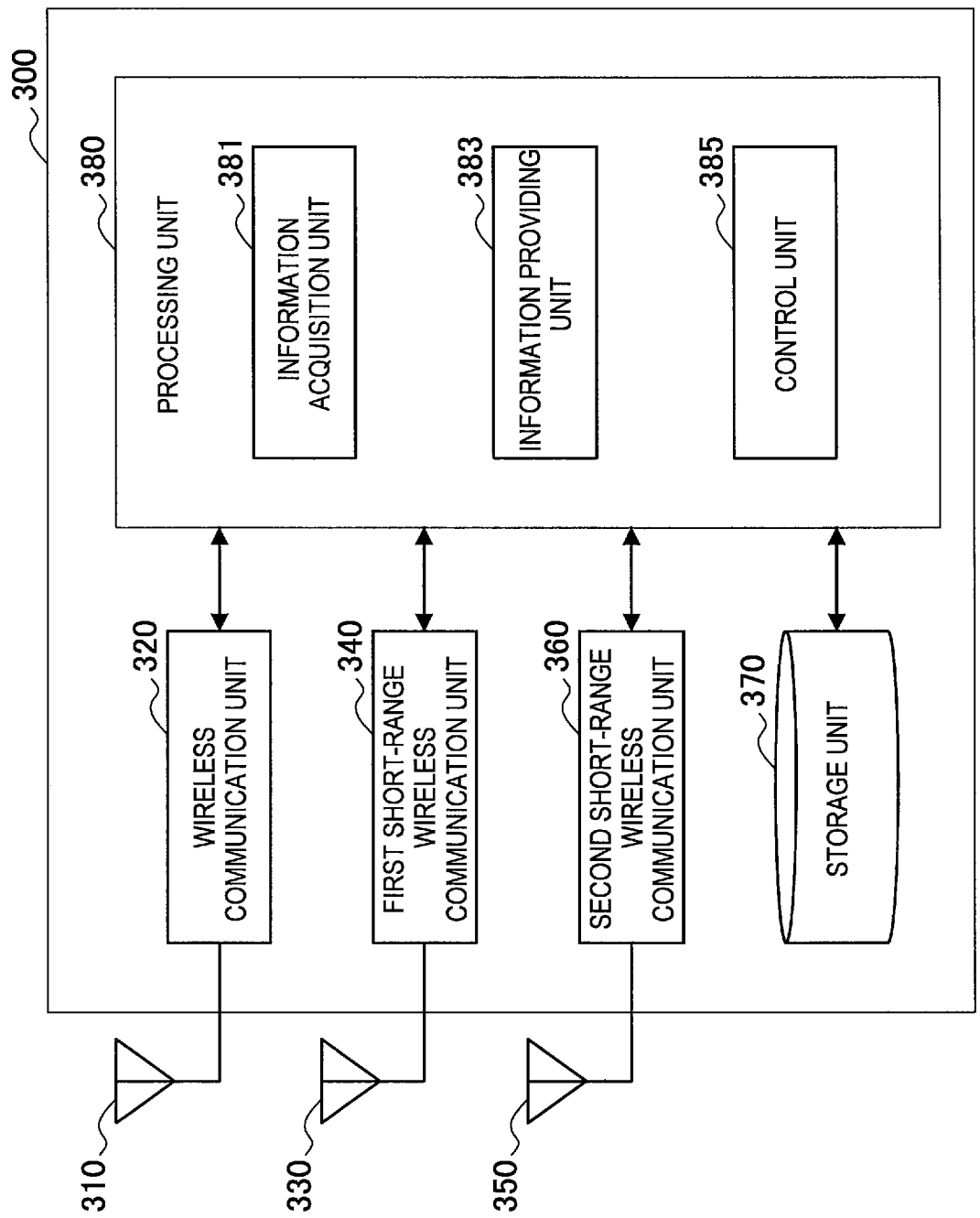

[Fig. 17]
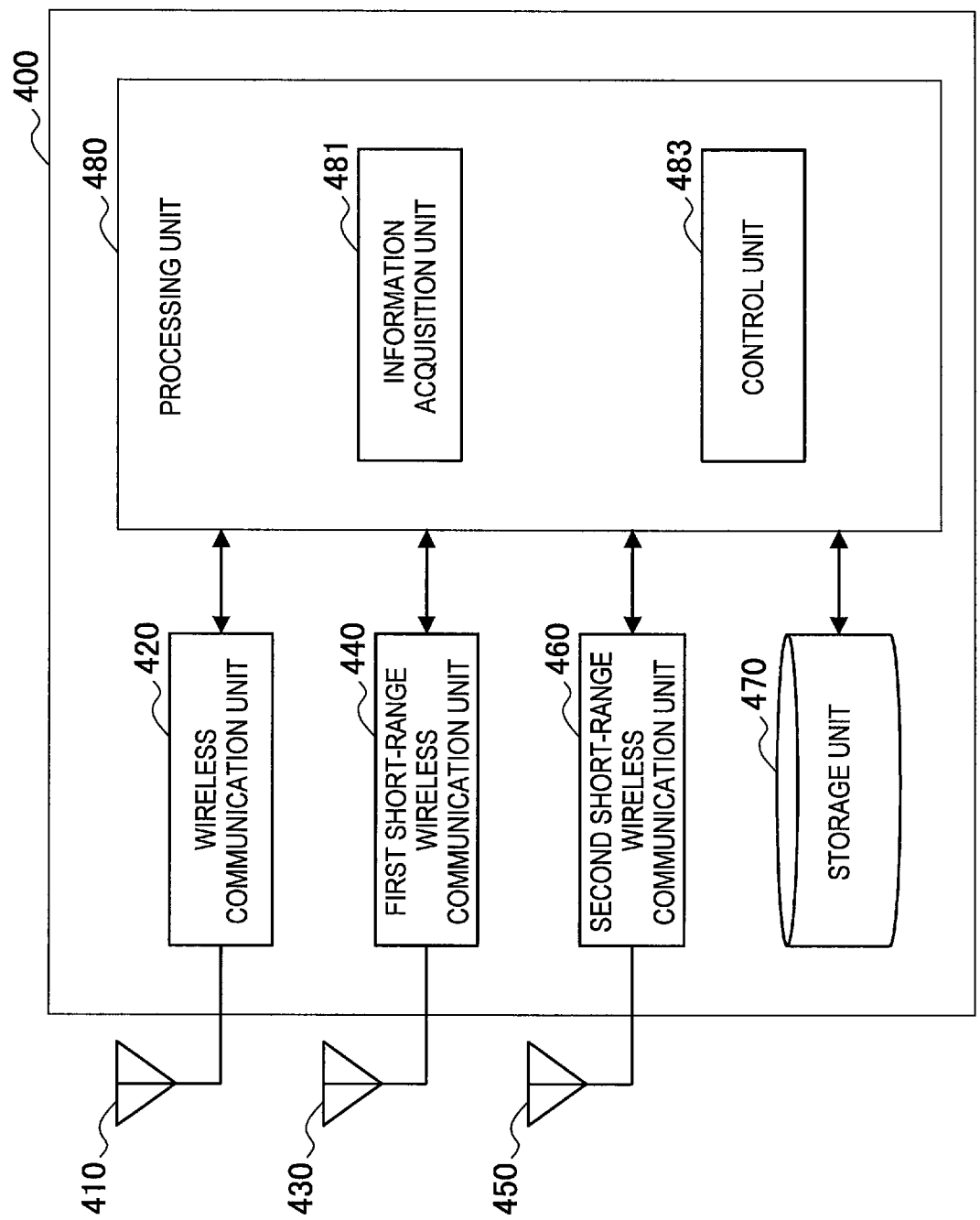

[Fig. 18]
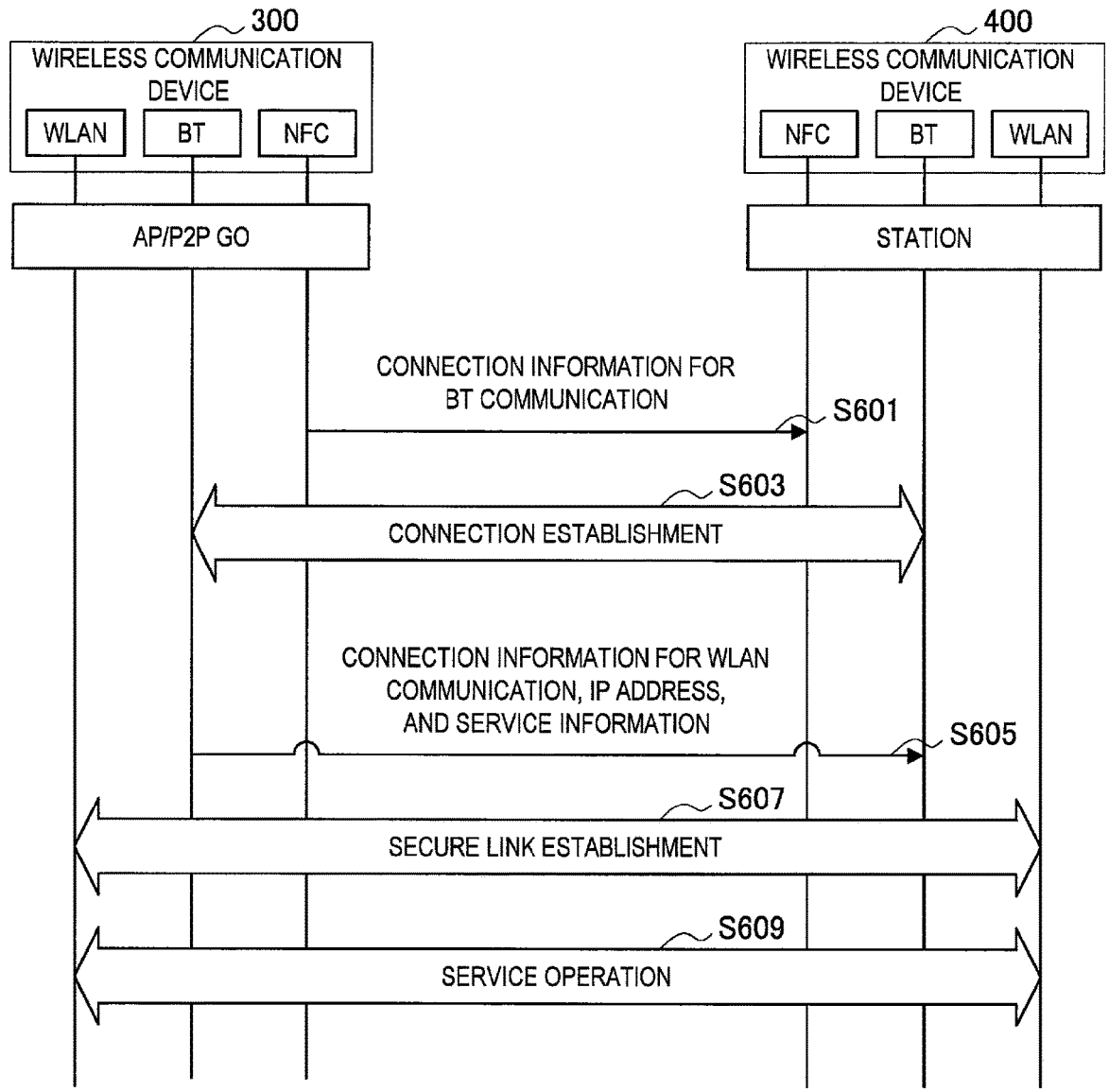

[Fig. 19]
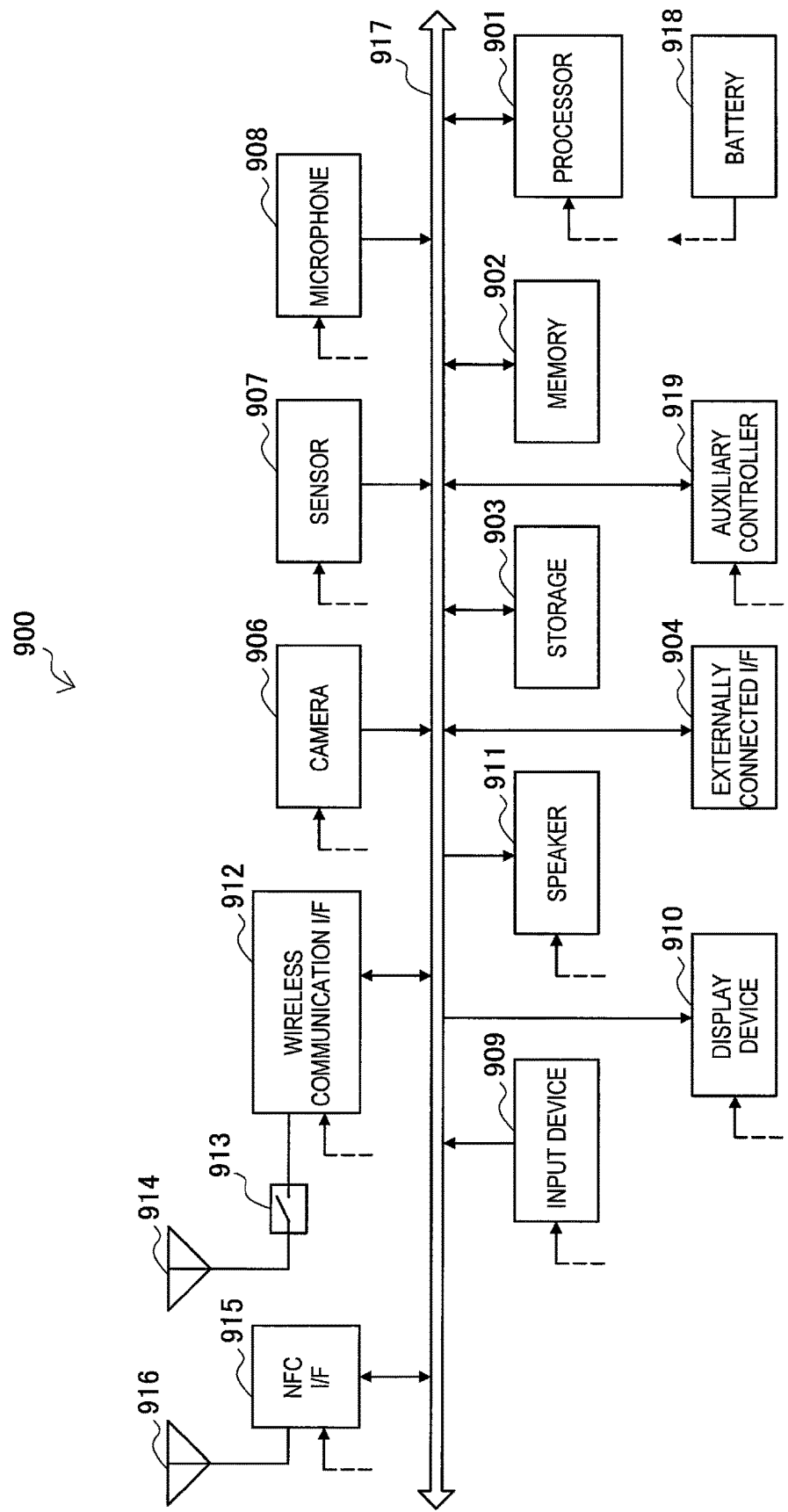

[Fig. 20]
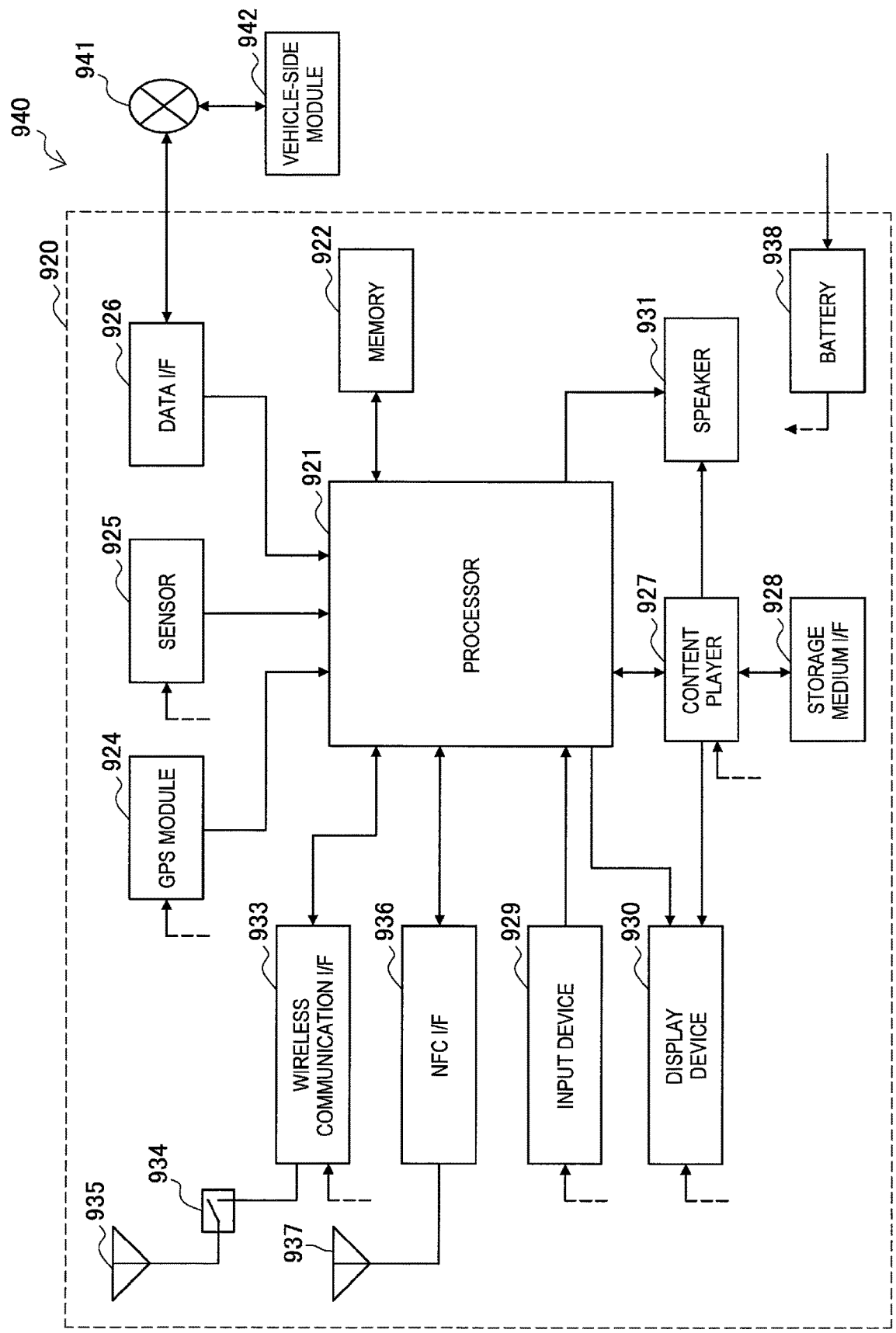

[Fig. 21]
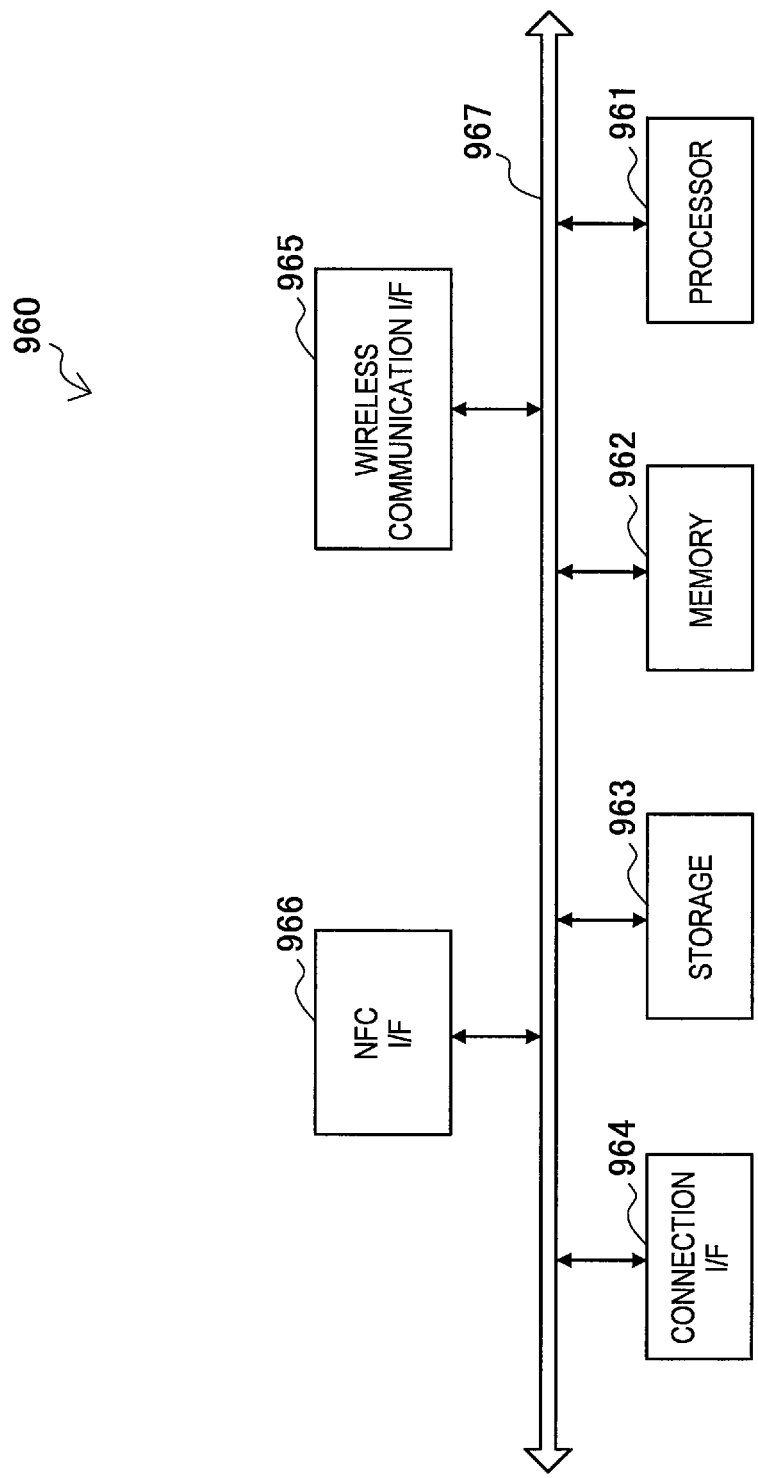

WIRELESS COMMUNICATION DEVICE AND WIRELESS COMMUNICATION METHOD

CROSS REFERENCE TO RELATED APPLICATIONS

This application is a U.S. National Phase of International Patent Application No. PCT/JP2014/005737 filed on Nov. 14, 2014, which claims priority benefit of Japanese Patent Application No. JP 2013-263105 filed in the Japan Patent Office on Dec. 19, 2013. Each of the above-referenced applications is hereby incorporated herein by reference in its entirety.

TECHNICAL FIELD

The present disclosure relates to a wireless communication device, a program, and a wireless communication method.

BACKGROUND ART

In recent years, a wireless LAN (Local Area Network) that represents IEEE (Institute of Electrical and Electronics Engineers) 802.11 has become widespread. In addition, there is a device that can operate as an access point of a wireless LAN, and wireless LAN communication is also possible between devices due to such a device. In addition, wireless LAN communication is also possible between devices in Wi-Fi Direct administered by Wi-Fi Alliance.

On the other hand, devices with a function of short-range wireless communication in which the communication range is narrow have also become widespread. As an example of the short-range wireless communication, there is near field communication (NFC). A technology developed by associating such NFC and wireless LAN communication has also been proposed.

For example, PTL 1 discloses the technology in which devices first exchange information through NFC and then connect to each other using Wi-Fi Direct.

CITATION LIST

Patent Literature

[PTL 1]
PCT/JP2013/057914

SUMMARY

Technical Problem

In the related art including the technology disclosed in PTL 1 described above, however, much time can be taken for devices to connect to each other using wireless LAN communication, and further to provide or use services through the wireless LAN communication. For this reason, convenience of the devices for users can deteriorate.

Thus, it is desired to provide a mechanism that enables provision or use of services through wireless communication to be started quickly.

Solution to Problem

According to a first exemplary embodiment, the disclosure is directed to an electronic device that transmits, via a first communication interface to another electronic device, an IP (Internet Protocol) address; and communicates with the another electronic device via a second communication interface in accordance with the IP address.

According to another exemplary embodiment, the disclosure is directed to a non-transitory computer-readable medium including computer-program instructions, which when executed by an electronic device, cause the electronic device to: transmit, via a first communication interface to another electronic device, an IP (Internet Protocol) address; and communicate with the another electronic device via a second communication interface in accordance with the IP address.

According to another exemplary embodiment, the disclosure is directed to a method performed by an electronic device, the method including: transmitting, via a first communication interface to another electronic device, an IP (Internet Protocol) address; and communicating with the another electronic device via a second communication interface in accordance with the IP address.

Advantageous Effects of Invention

According to the present disclosure described above, it is possible to start provision or use of services through wireless communication more quickly. Note that the effect is not necessarily definite, and in addition to or instead of the effect, any effect that the specification intends to introduce or another effect that can be ascertained from the specification may be exhibited.

BRIEF DESCRIPTION OF DRAWINGS

FIG. 1 is an illustrative diagram for describing an example of wireless communication devices that provide and use a service through wireless LAN communication.

FIG. 2 is a sequence diagram showing a first example of the flow of a process before provision and use of a service through wireless LAN communication is started.

FIG. 3 is a sequence diagram showing a second example of the flow of a process before provision and use of a service through wireless LAN communication is started.

FIG. 4 is an illustrative diagram showing an example of a schematic configuration of a communication system according to a first embodiment.

FIG. 5 is a block diagram showing an example of a configuration of a first wireless communication device according to the first embodiment.

FIG. 6 is a block diagram showing an example of a configuration of a second wireless communication device according to the first embodiment.

FIG. 7 is a sequence diagram showing a first example of the schematic flow of a communication control process according to the first embodiment.

FIG. 8 is a sequence diagram showing a second example of the schematic flow of the communication control process according to the first embodiment.

FIG. 9 is an illustrative diagram for describing an example of a size of antennas for short-range wireless communication.

FIG. 10 is an illustrative diagram for describing another example of a size of the antennas for short-range wireless communication.

FIG. 11 is a flowchart showing an example of the schematic flow of a process performed by a wireless communication device according to a first modified example of the first embodiment.

FIG. 12 is an illustrative diagram for describing a mechanism relating to identification information associated with service information.

FIG. 13 is an illustrative diagram for describing an example of a screen displayed regardless of whether there is a manipulation of a user.

FIG. 14 is an illustrative diagram for describing an example of display of the screen showing an abnormality of the wireless communication device.

FIG. 15 is an illustrative diagram showing an example of a schematic configuration of a communication system according to a second embodiment.

FIG. 16 is a block diagram showing an example of a configuration of a first wireless communication device according to the second embodiment.

FIG. 17 is a block diagram showing an example of a configuration of a second wireless communication device according to the second embodiment.

FIG. 18 is a sequence diagram showing an example of the schematic flow of a communication control process according to the second embodiment.

FIG. 19 is a block diagram showing an example of a schematic configuration of a smartphone to which the technology of the present disclosure can be applied.

FIG. 20 is a block diagram showing an example of a schematic configuration of a car navigation device to which the technology of the present disclosure can be applied.

FIG. 21 is a block diagram showing an example of a schematic configuration of a wireless communication module to which the technology of the present disclosure can be applied.

DESCRIPTION OF EMBODIMENTS

Hereinafter, exemplary embodiments of the present disclosure will be described in detail with reference to accompanying drawings. It should be noted that, in the specification and the drawings, overlapping description will be avoided by giving the same reference numerals to constituent elements that have substantially the same functional configurations.

Note that description will be provided in the following order.
1. Introduction
2. First embodiment
2.1. Schematic configuration of a communication system
2.2. Configuration of a first wireless communication device
2.3. Configuration of a second wireless communication device
2.4. Flow of process
2.5. First modified example
2.6. Second modified example
2.7. Third modified example
2.8. Fourth modified example
3. Second embodiment
3.1. Schematic configuration of a communication system
3.2. Configuration of a first wireless communication device
3.3. Configuration of a second wireless communication device
3.4. Flow of process
3.5. First modified example
3.6. Second modified example
4. Application example
4.1. First application example
4.2. Second application example
4.3. Third application example
5. Conclusion 1. Introduction First, an example of the flow of a process before provision and use of a service through wireless LAN communication is started will be described with reference to FIGS. 1 to 3.
(Wireless Communication Device as a Premise)

FIG. 1 is an illustrative diagram for describing an example of wireless communication devices that provide and use a service through wireless LAN communication. Referring to FIG. 1, the wireless communication device 10 has a function of wireless LAN communication and a function of NFC, performs wireless LAN communication via an antenna 11, and performs NFC via another antenna 12. In addition, another wireless communication device 20 also has the function of wireless LAN communication and the function of NFC, performs wireless LAN communication via an antenna 21, and performs NFC via another antenna 22. For example, the wireless communication device 10 can operate as an access point of a wireless LAN.
(First Example Before a Service is Provided and Used)

FIG. 2 is a sequence diagram showing a first example of the flow of a process before provision and use of a service through the wireless LAN communication is started.

In this example, the wireless communication device 10 operates as an access point introduced in the IEEE 802.11 series or a P2P group owner (P2P GO) of Wi-Fi Direct, and the wireless communication device 20 operates as a station introduced in the IEEE 802.11 series. First, when one of the wireless communication device 10 and the wireless communication device 20 comes close to the other, the wireless communication device 10 provides the wireless communication device 20 with connection information for wireless LAN communication through NFC (S31). The connection information includes, for example, an SSID (Service Set Identifier) and a PSK (Pre-Shared Key). As an example, the PSK is a WPA2-PSK (Wi-Fi Protected Access 2 Pre-Shared Key).

Next, the wireless communication device 10 and the wireless communication device 20 exchange a probe request (Probe Request) and a probe response (Probe Response) through wireless LAN communication (S33). To be specific, the wireless communication device 20 performs scanning using each of channels (for example, channel 1 to channel 14) of wireless LAN, and transmits the probe request to the wireless communication device 10 upon receiving a beacon. Then, the wireless communication device 10 transmits the probe response to the wireless communication device 20.

Then, the wireless communication device 10 and the wireless communication device 20 establish a secure link in the wireless LAN communication (S35). In other words, the wireless communication device 10 and the wireless communication device 20 are securely connected to each other. Note that, when the secure link is established, 4-way handshaking is performed. In addition, the secure link is a link encrypted using the PSK (for example, WPA2-PSK).

Then, an IP (Internet Protocol) address is assigned (S37). For example, a proper IP address is automatically decided so that the wireless communication device 10 and the wireless communication device 20 can communicate according to a DHCP (Dynamic Host Configuration Protocol).

Then, the wireless communication device 10 and the wireless communication device 20 perform service discovery (Service Discovery) (S39). For example, the wireless communication device 10 and the wireless communication device 20 exchange a service discovery request (Service Discovery Request) and a service discovery response (Service Discover Response). Accordingly, information for specifying a device and a service is transmitted. The information is of, for example, a device class and a service class. Note that other information for provision or use of the service may be exchanged. In addition, when there are a plurality of devices, for example, a user may select one of the plurality of devices. In addition, when there are a plurality of services, for example, the user may select one of the plurality of services.

Then, provision and use of the service through the wireless LAN communication is started between the wireless communication device 10 and the wireless communication device 20 (S41).

(Second Example Before a Service is Provided and Used)

FIG. 3 is a sequence diagram showing a second example of the flow of a process before provision and use of a service through wireless LAN communication is started. The second example is the flow of the process relating to DLNA (Digital Living Network Alliance) and Miracast.

In this example, the wireless communication device 10 operates as a P2P group owner (P2P GO) of Wi-Fi Direct, and the wireless communication device 20 operates as a P2P device. The P2P device is in a state in which it is neither a P2P group owner nor a P2P client. First, when one of the wireless communication device 10 and the wireless communication device 20 comes close to the other, the wireless communication device 10 provides the wireless communication device 20 with connection information for wireless LAN communication through NFC (S51). The connection information includes, for example, a P2P (peer-to-peer) device address.

Next, the wireless communication device 10 and the wireless communication device 20 perform device discovery (Device Discovery) (S53). For example, the wireless communication device 10 and the wireless communication device 20 exchange a probe request and a probe response through wireless LAN communication.

In addition, the wireless communication device 10 and the wireless communication device 20 can optionally perform service discovery (S55). Accordingly, information for specifying a device and a service is transmitted. The information is of, for example, a device class and a service class. Note that other information for provision or use of the service may be exchanged. In addition, when there are a plurality of devices, for example, a user may select one of the plurality of devices. In addition, when there are a plurality of services, for example, the user may select one of the plurality of services.

Then, the wireless communication device 10 and the wireless communication device 20 perform provision discovery (Provision Discovery) or invitation (Invitation) (S57). For example, in the case of the provision discovery, the wireless communication device 20 transmits a provision discovery request (Provision Discovery Request) to the wireless communication device 10, and then the wireless communication device 10 transmits a provision discovery response (Provision Discovery Response) to the wireless communication device 20. On the other hand, in the case of invitation, the wireless communication device 10 transmits an invitation request (Invitation Request) to the wireless communication device 20, and then the wireless communication device 20 transmits an invitation response (Invitation Response) to the wireless communication device 10.

Then, through WSC (Wi-Fi Simple Configuration) exchange, encryption key information is shared between the wireless communication device 10 and the wireless communication device 20 (S59). Then, the wireless communication device 20 becomes a P2P client.

Then, the wireless communication device 10 and the wireless communication device 20 establish a secure link in the wireless LAN communication (S61). In other words, the wireless communication device 10 and the wireless communication device 20 are securely connected to each other. Note that the secure link is a link encrypted using the PSK (for example, WPA2-PSK).

Then, an IP (Internet Protocol) address is assigned (S63). For example, a subnet mask and a DNS server address are exchanged and then IP addresses of both the wireless communication device 10 and the wireless communication device 20 are decided.

In addition, the wireless communication device 10 and the wireless communication device 20 perform service negotiation (Service Negotiation) (S65). In the service negotiation, information necessary for provision and use of the service is exchanged. As an example, in the case of Miracast, capability negotiation (Capability Negotiation) is performed as service negotiation, and capability information relating to the service and the like are exchanged.

Then, provision and use of the service through the wireless LAN communication is started between the wireless communication device 10 and the wireless communication device 20 (S67).

Hereinabove, the examples of the flows of the processes before provision and use of the service through wireless LAN communication are started have been described. As in the examples, there are many procedures before provision and use of the service are started. For this reason, it may take a long time to start provision and user of the service.

2. First Embodiment

Next, a first embodiment of the present disclosure will be described with reference to FIGS. 4 to 14.

2.1. Schematic Configuration of a Communication System

First, a schematic configuration of a communication system 1 according to the first embodiment of the present disclosure will be described with reference to FIG. 4. FIG. 4 is an illustrative diagram showing an example of the schematic configuration of the communication system 1 according to the first embodiment. Referring to FIG. 4, the communication system 1 includes a wireless communication device 100 and a wireless communication device 200.

The wireless communication device 100 has the function of wireless communication according to a predetermined communication scheme, and performs the wireless communication via an antenna unit 110. For example, the wireless communication is wireless LAN communication, and the predetermined communication scheme is a communication scheme using, for example, the IEEE 802.11 specification. The IEEE 802.11 specification is the specification of any of the IEEE 802.11 series (for example, IEEE 802.11a, 11b, 11g, 11n, 11ac, and 11ad). Alternatively, the predetermined communication scheme may be a communication scheme that uses another wireless LAN standard specification. In addition, the wireless communication device 200 also has the function of wireless communication according to the predetermined communication scheme, and performs the wireless communication via an antenna unit 210. The wireless communication device 100 and the wireless communication device 200 perform the wireless communication (for example, wireless LAN communication) with each other.

In addition, the wireless communication device 100 has the function of short-range wireless communication, and thus performs short-range wireless communication via another antenna unit 130. For example, the short-range wireless communication is near field communication (NFC). To be more specific, the short-range wireless communication is NFC that complies with any of various standards, for example, ISO/IEC 14443 Type A, ISO/IEC 14443 Type B, ISO/IEC 15693, ISO/IEC 18092, ISO/IEC 21481, and the like. In addition, the wireless communication device 200 also has the function of the short-range wireless communication, and thus performs the short-range wireless communication via another antenna unit 230. The wireless communication device 100 and the wireless communication device 200 perform the short-range wireless communication (for example, NFC) with each other.

2.2. Configuration of a First Wireless Communication Device

Next, an example of a configuration of the wireless communication device 100 according to the first embodiment will be described with reference to FIG. 5. FIG. 5 is a block diagram showing an example of a configuration of the wireless communication device 100 according to the first embodiment. Referring to FIG. 5, the wireless communication device 100 includes the antenna unit 110, a wireless communication unit 120, the antenna unit 130, a short-range wireless communication unit 140, a storage unit 150, and a processing unit 160.

(Antenna Unit 110)

The antenna unit 110 releases signals output from the wireless communication unit 120 to a space as radio waves. In addition, the antenna unit 110 converts radio waves of a space into signals and then outputs the signals to the wireless communication unit 120.

(Wireless Communication Unit 120)

The wireless communication unit 120 performs the wireless communication according to the predetermined communication scheme. As described above, the wireless communication is, for example, wireless LAN communication. The wireless communication unit 120, for example, transmits signals to another wireless communication device via the antenna unit 110 and receives signals from another wireless communication device via the antenna unit 110.

(Antenna Unit 130)

The antenna unit 130 releases signals output by the short-range wireless communication unit 140 to a space as radio waves. In addition, the antenna unit 130 converts radio waves of a space into signals and outputs the signals to the short-range wireless communication unit 140.

(Short-Range Wireless Communication Unit 140)

The short-range wireless communication unit 140 performs short-range wireless communication. As described above, the short-range wireless communication is, for example, NFC. The short-range wireless communication unit 140, for example, transmits signals to another wireless communication device via the antenna unit 130, and receives signals from another wireless communication device via the antenna unit 130.

(Storage Unit 150)

The storage unit 150 temporarily or permanently stores programs and data for operations of the wireless communication device 100.

(Processing Unit 160)

The processing unit 160 provides various functions of the wireless communication device 100. The processing unit 160 includes an information acquisition unit 161, an information providing unit 163, and a control unit 165.

(Information Acquisition Unit 161)

Connection Information

The information acquisition unit 161 acquires connection information to be used for performing wireless communication with another wireless communication device according to a predetermined communication scheme. The other wireless communication device is, for example, the wireless communication device 200.

As described above, the wireless communication is, for example, wireless LAN communication, and the predetermined communication scheme is, for example, a communication scheme that uses the IEEE 802.11 specification. The IEEE 802.11 specification is the specification of any of the IEEE 802.11 series (for example, IEEE 802.11a, 11b, 11g, 11n, 11ac, and 11ad). Alternatively, the predetermined communication scheme may be a communication scheme that uses another wireless LAN standard specification.

Identification Information or an Address

The connection information includes identification information or an address of the wireless communication device 100.

For example, the wireless communication device 100 operates as an access point of the IEEE 802.11 series or a P2P group owner (P2P GO) of Wi-Fi Direct, and the other wireless communication device (for example, the wireless communication device 200) operates as a station of the IEEE 802.11 series. In this case, the connection information includes, for example, an SSID.

Note that the wireless communication device 100 may operate as a P2P group owner (P2P GO) of Wi-Fi Direct, and the other wireless communication device (for example, the wireless communication device 200) may operate a P2P device of Wi-Fi Direct. In this case, the connection information may include a P2P device address.

Information for an Encryption Process or Decryption Process

In addition, the connection information includes information used in an encryption process or a decryption process. To be specific, the connection information includes, for example, a PSK. As an example, the PSK is a WPA2-PSK.

Wireless Channel

The connection information further includes, for example, channel information representing a wireless channel used in connection with the wireless communication device 200.

To be more specific, the channel information represents, for example, a wireless channel used in connection with the wireless communication device 200 among a plurality of available wireless channels (for example, channels 1 to 11). In other words, the channel information represents a wireless channel used by the wireless communication device 100 (for example, a channel X).

Note that the connection information described above is stored in the storage unit 150, and the information acquisition unit 161 acquires the connection information from the storage unit 150.

IP Address

The information acquisition unit 161 acquires, for example, IP addresses.

The IP addresses include, for example, at least one of the IP address assigned to the wireless communication device 100 and the IP address assigned to the other wireless communication device (for example, the wireless communication device 200).

Acquisition Method

The IP addresses are, for example, assigned in advance to be used in inter-device communication with the wireless communication device 200. In addition, the IP addresses are stored in, for example, the storage unit 150. The information acquisition unit 161 acquires the IP addresses from the storage unit 150.

Application

The IP addresses are used when, for example, information is transmitted or received. To be more specific, the IP addresses are used when, for example, image information, dynamic image information, or music information is transmitted or received.

Note that the IP addresses may be used in a network environment in which at least three or more communication devices are included. For example, for communication performed within a group of communication devices including the wireless communication device 100 and the wireless communication device 200, the IP addresses may be used.

Service Information

The information acquisition unit 161 acquires, for example, service information for use or provision of a service through the wireless communication (for example, wireless LAN communication) according to the predetermined communication scheme. The service information includes, for example, information exchanged in service discovery.

Service

The service through the wireless communication is provided by a server of the service and used by a client of the service. For example, the wireless communication device 100 is the server of the service. Note that the wireless communication device 100 may be a client of the service.

The service is, for example, a content providing service, and the server provides clients with content data. In this case, as an example, the server is a camera, the client is a smartphone, and the content data is dynamic image data or image data. As another example (an example of DLNA or Miracast), the server is a smartphone, the client is a display device, and the content data is dynamic image data or image data In addition, the service is, for example, a remotely controlled service, and the server operates according to remote control by the client. In this case, as an example, the server is a camera, and the client is a smartphone. In other words, the smartphone remotely controls the camera. In addition, as another example, the server is a smartphone, and the client is a wearable device. In other words, the wearable device remotely controls the smartphone.

In addition, the service is, for example, an uploading service, and the server performs uploading of data provided by the client. In this case, as an example the service is the uploading service of an SNS (Social Networking Service), the client is a camera, the server is a smartphone, and the data is dynamic image data or image data.

Information for Specifying a Device and a Service

The service information includes, for example, information for specifying the wireless communication device 100 and a service (hereinafter referred to as "specifying information"). The information is, for example, of a device class and a service class.

To be more specific, the wireless communication device 100 operates as, for example, a server that provides the service. In this case, the specifying information is information for specifying the wireless communication device 100 that serves as a server and the service provided by the wireless communication device 100.

Note that the wireless communication device 100 may operate as a client that uses the service. In this case, the specifying information may be information for specifying the wireless communication device 100 as a client and the service that the wireless communication device 100 can use.

Access Information

The service information includes, for example, access information that enables access to information stored by the wireless communication device 100 (hereinafter referred to as "stored information") for use or provision of the service.

To be more specific, the access information is, for example, URL (Uniform Resource Locator) information that enables access to information stored by the wireless communication device 100. The access includes HTTP (Hypertext Transfer Protocol) access, FTP (File Transfer Protocol) access, and the like.

As an example, when the service is a content providing service, the stored information is content data. As another example, when the service is a remotely controlled service, the stored information is information of a control command that a server can accept. As still another example, the stored information is information representing capability of the wireless communication device 100 with regard to the service.

As described above, the information acquisition unit 161 acquires the connection information and additional information (for example, the IP addresses and/or the service information).

(Information Providing Unit 163)

The information providing unit 163 provides the other wireless communication device with information through the short-range wireless communication.

Connection Information

The information providing unit 163 provides the other wireless communication device with the connection information (in other words, connection information used to perform the wireless communication with the other wireless communication device) through the short-range wireless communication.

For example, when one of the wireless communication device 100 and the other wireless communication device (for example, the wireless communication device 200) comes close to the other, the information providing unit 163 provides the other wireless communication device with the connection information via the short-range wireless communication unit 140.

Note that, as described above, the connection information includes, for example, the channel information (i.e., information representing a wireless channel used in connection with the wireless communication device 200). Thus, the other wireless communication device may, for example, scan one channel rather than scanning a plurality of channels for connection with the wireless communication device 100. For this reason, the other wireless communication device can be connected to the wireless communication device 100 quickly. As a result, provision or use of the service can be started sooner.

IP Address

The information providing unit 163 provides the other wireless communication device with, for example, the IP addresses through the short-range wireless communication.

In other words, the information providing unit 163 provides the other wireless communication device with the IP addresses and the connection information through the short-range wireless communication. The other wireless communication device is, for example, the wireless communication device 200.

When, for example, one of the wireless communication device 100 and the other wireless communication device (for example, the wireless communication device 200) comes close to the other, the information providing unit 163 provides the other wireless communication device with the connection information and the IP addresses via the short-range wireless communication unit 140.

Accordingly, for example, assignment of IP addresses that would otherwise be performed after connection of the wireless communication device 100 to the other wireless communication device is omitted. Thus, provision or use of the service can be started sooner.

Note that it may take a long period of time to assign the IP addresses after the connection depending on implementation. As an example, since the range of the values of the IP addresses used in communication varies depending on wireless communication devices, the other wireless communication device that operates such that an IP address is automatically decided using DHCP attempts to connect to the wireless communication device 100 using the IP address decided shortly before and the connection can fail. As a result, it may take a long period of time to assign a correct IP address.

Service Information

The information providing unit 163 further provides, for example, the service information (in other words, information for use or provision of the service through the wireless communication) through the short-range wireless communication.

When, for example, one of the wireless communication device 100 and the other wireless communication device (for example, the wireless communication device 200) comes close to the other, the information providing unit 163 provides the other wireless communication device with the connection information and the service information via the short-range wireless communication unit 140.

Accordingly, for example, service discovery that would otherwise be performed before the start of provision and use of the service by the wireless communication device 100 and the other wireless communication device is omitted. Thus, the provision or use of the service can be started sooner.

As described above, the information providing unit 163 provides the other wireless communication device with the connection information and additional information (for example, the IP addresses and/or the service information) through the short-range wireless communication.

(Control Unit 165)

Connection Process

The control unit 165 performs, for example, a connection process for performing the wireless communication (for example, wireless LAN communication). The connection process includes, for example, transmission of a probe request or probe response and establishment of a secure link via the wireless communication unit 120.

Control of Communication with the Other Wireless Communication Device

The control unit 165 controls, for example, communication of the other wireless communication device that is connected to the wireless communication device 100.

As described above, the IP addresses are provided to, for example, the other wireless communication device. In this case, the control unit 165 controls communication with the other wireless communication device using the IP addresses. For example, the control unit 165 performs packet communication with the other wireless communication device using the IP addresses.

Exchanged Information

The wireless communication device 100 transmits or receives, for example, image information, dynamic image information or music information. Note that the wireless communication device 100 may transmit or receive information of other kinds.

Transmission and Reception Timing

The wireless communication device 100 transmits or receives image information, dynamic image information or music information after a secure link with the other wireless communication device (for example, the wireless communication device 200) is established. Further, to be specific, the wireless communication device 100 transmits or receives image information, dynamic image information or music information without receiving a service discovery response including an IP address after the secure link with the other wireless communication device (for example, the wireless communication device 200) is established. Note that the wireless communication device 100 uses the IP address when the image information, dynamic image information or music information is transmitted or received.

In addition, after the secure link with the other wireless communication device (for example, the wireless communication device 200) is established, for example, the wireless communication device 100 performs communication using the IP address regardless of whether there is a manipulation input from a user.

Communication Under a Network Environment in which Three or More Communication Devices are Included Note that the wireless communication device 100 may use the IP address under a network environment in which at least three or more communication devices are included. For example, the wireless communication device 100 may use the IP address for, for example, communication performed within a group of communication devices including the wireless communication device 100 and the wireless communication device 200.

Control for Provision or Use of a Service

The control unit 165 performs control for, for example, provision or use of a service.

As an example, when the service is a content providing service, the control includes providing content data as a server via a wireless communication unit 120 or acquiring content as a client data via the wireless communication unit 120.

As another example, when the service is a remotely controlled service, the control includes causing the wireless communication device 100 to operate according to a control command provided by another wireless communication device as a server or providing another wireless communication device with a control command via the wireless communication unit 120 as a client.

As still another example, when the service is an uploading service, the control includes performing uploading as a server or requesting, as a client, another wireless communication device for uploading.

2.3. Configuration of a Second Wireless Communication Device

Next, an example of a configuration of the wireless communication device 200 according to the first embodiment will be described with reference to FIG. 6. FIG. 6 is a block diagram showing an example of a configuration of the wireless communication device 200 according to the first embodiment. Referring to FIG. 6, the wireless communication device 200 includes the antenna unit 210, a wireless communication unit 220, the antenna unit 230, a short-range wireless communication unit 240, a storage unit 250, and a processing unit 260.

Description of the antenna unit 210, the wireless communication unit 220, the antenna unit 230, the short-range wireless communication unit 240, and the storage unit 250 is the same as that of the antenna unit 110, the wireless communication unit 120, the antenna unit 130, the short-range wireless communication unit 140, and the storage unit 150 of the wireless communication device 100 described above except that the reference numerals thereof are different from each other. Thus, overlapping description will be omitted.

(Processing Unit 260)

The processing unit 260 provides various functions of the wireless communication device 200. The processing unit 260 includes an information acquisition unit 261 and a control unit 263.

(Information Acquisition Unit 261)

Connection Information

The information acquisition unit 261 acquires connection information to be used in performing wireless communication with another wireless communication device according to a predetermined communication scheme from the other wireless communication device via short-range wireless communication. The other wireless communication device is, for example, the wireless communication device 100.

When one of the wireless communication device 100 and the wireless communication device 200 comes close to the other, for example, the information acquisition unit 261 acquires the connection information provided by the wireless communication device 100 via the short-range wireless communication unit 240.

As described above, the wireless communication is, for example, wireless LAN communication, and the predetermined communication scheme is, for example, a communication scheme using the IEEE 802.11 specification. The IEEE 802.11 specification is the specification of any of the IEEE 802.11 series (for example, IEEE 802.11a, 11b, 11g, 11n, 11ac, and 11ad). Alternatively, the predetermined communication scheme may be a communication scheme that uses another wireless LAN standard specification.

Identification Information or an Address

The connection information includes identification information or an address of the other wireless communication device (for example, the wireless communication device 100).

The other wireless communication device (for example, the wireless communication device 100) operates as, for example, an access point of the IEEE 802.11 series or a P2P group owner (P2P GO) of Wi-Fi Direct, and the wireless communication device 200 operates as a station of the IEEE 802.11 series. In this case, the connection information includes, for example, an SSID.

Note that the other wireless communication device (for example, the wireless communication device 100) may operate as a P2P group owner (P2P GO) of Wi-Fi Direct and the wireless communication device 200 may operate as a P2P device of Wi-Fi Direct. In this case, the connection information may include a P2P device address.

Information for an Encryption Process or Decryption Process

In addition, the connection information includes information used in an encryption process or a decryption process. To be specific, the connection information includes, for example, a PSK. As an example, the PSK is a WPA2-PSK.

Wireless Channel

The connection information further includes, for example, channel information representing a wireless channel used in connection with the other wireless communication device (for example, the wireless communication device 100). Note that specific content of the channel information is as described with respect to the wireless communication device 100.

Accordingly, the wireless communication device 200 may scan one channel rather than scanning a plurality of channels for connection with the other wireless communication device (for example, the wireless communication device 100). For this reason, the wireless communication device 200 can be connected to the other wireless communication device (for example, the wireless communication device 100) quickly. As a result, provision or use of a service can be started sooner.

IP Address

The information acquisition unit 261 acquires an IP address from the other wireless communication device through short-range wireless communication. In other words, the information acquisition unit 261 acquires the IP address and the connection information from the other wireless communication device (for example, the wireless communication device 100) through short-range wireless communication.

The IP address includes, for example, at least one of the IP address assigned to the other wireless communication device (for example, the wireless communication device 100) and the IP address assigned to the wireless communication device 200.

Acquisition Method

When, for example, one of the other wireless communication device (for example, the wireless communication device 100) and the wireless communication device 200 comes close to the other, the information acquisition unit 261 acquires the IP address provided together with the connection information by the other wireless communication device (for example, the wireless communication device 100) via the short-range wireless communication unit 240.

Accordingly, assignment of IP addresses performed, for example, after connection of other wireless communication device (for example, the wireless communication device 100) with the wireless communication device 200 is omitted. Thus, provision or use of a service can be started sooner.

Application

As described above, the IP address is used when, for example, information is transmitted or received. To be more specific, the IP address is used when, for example, image information, dynamic image information or music information is transmitted or received.

Note that, as described above, the IP address may be used in a network environment in which at least three or more communication devices are included. For example, the IP address may be used for communication performed within a group of communication devices including the wireless communication device 100 and the wireless communication device 200.

Service Information

Furthermore, service information (in other words, information for use or provision of a service through the wireless communication), for example, is provided to the wireless communication device 200 by the other wireless communication device (for example, the wireless communication device 100) through short-range wireless communication. In this case, the information acquisition unit 261 further acquires the service information.

When, for example, one of the other wireless communication device (for example, the wireless communication device 100) and the wireless communication device 200 comes close to the other, the information acquisition unit 261 acquires the service information provided together with the connection information by the other wireless communication device via the short-range wireless communication unit 240.

Accordingly, service discovery, for example, that is performed before a start of provision and use of a service by the other wireless communication device (for example, the wireless communication device 100) and the wireless communication device 200 is omitted. Thus, provision or use of the service can be started sooner.

Note that acquisition of the above-described information (for example, connection information, IP address and/or service information, and the like) from the other wireless communication device (for example, the wireless communication device 100) through the short-range wireless communication is detected by the processing unit 260 (for example, the control unit 263).

(Control Unit 263)

Connection Process

The control unit 263 performs, for example, a connection process for performing the wireless communication (for example, wireless LAN communication). The control unit 263 performs the connection process using, for example, the connection information acquired by the information acquisition unit 261.

The connection process includes, for example, transmission of a probe request or a probe response, establishment of a secure link, and the like via the wireless communication unit 220.

Note that, as described above, the connection information acquired by the information acquisition unit 261 includes, for example, the channel information (in other words, information representing a wireless channel used in connection with the wireless communication device 100). In this case, the control unit 263 performs the connection process using the channel information. The control unit 263 performs scanning using, for example, the wireless channel represented by the channel information.

Control of Communication with the Other Wireless Communication Device

The control unit 263 controls, for example, communication with the other wireless communication device connected to the wireless communication device 200. The control unit 263, for example, controls communication with the wireless communication device 100 after the wireless communication device 200 is connected to the wireless communication device 100.

As described above, the information acquisition unit 261 acquires, for example, the IP address. In this case, the control unit 263 controls communication with the other wireless communication device (for example, the wireless communication device 100) using the IP address. The control unit 263 performs, for example, packet communication with the other wireless communication device (for example, the wireless communication device 100) using the IP address.

Transmitted and Received Information

The wireless communication device 200 transmits or receives, for example, image information, dynamic image information, or music information. Note that the wireless communication device 200 may transmit or receive information of other kinds.

Transmission and Reception Timing

The wireless communication device 200 transmits or receives image information, dynamic image information or music information after, for example, a secure link with the wireless communication device 100 is established. Further, to be specific, the wireless communication device 200 transmits or receives image information, dynamic image information or music information without transmitting a service discovery request or a service discovery response including an IP address after the secure link with the wireless communication device 100 is established. Note that the wireless communication device 200 uses the IP address when the image information, dynamic image information or music information is transmitted or received.

In addition, after the secure link with the wireless communication device 100 is established, for example, the wireless communication device 200 performs communication using the IP address regardless of whether there is a manipulation input from a user.

Communication Under a Network Environment in which Three or More Communication Devices are Included Note that the wireless communication device 200 may use the IP address in a network environment in which at least three or more communication devices are included. The wireless communication device 200 may use the IP address for, for example, communication performed within a group of communication devices including the wireless communication device 100 and the wireless communication device 200.

Control for Provision or Use of a Service

The control unit 263 performs control for, for example, provision or use of a service.

As an example, when the service is a content providing service, the control includes providing content data as a server via the wireless communication unit 220 or acquiring content data as client via the wireless communication unit 220.

As another example, when the service is a remotely controlled service, the control includes causing, as a server, the wireless communication device 200 to operate according to a control command provided by the other wireless communication device, or providing, as a client, a control command to the wireless communication device 100 via the wireless communication unit 220.

As still another example, when the service is an uploading service, the control includes performing uploading as a server, or requesting uploading from the wireless communication device 100 as a client.

2.4. Flow of Process

Next, a communication control process according to the first embodiment will be described with reference to FIGS. 7 and 8. In the examples described below, the wireless communication is wireless LAN communication (also referred to as Wi-Fi communication), and the short-range wireless communication is NFC.

First Example

FIG. 7 is a sequence diagram showing a first example of the schematic flow of the communication control process according to the first embodiment.

As a premise, the wireless communication device 100 operates as an access point of the IEEE 802.11 series or a P2P group owner (P2P GO) of Wi-Fi Direct, and the wireless communication device 200 operates as a station of the IEEE 802.11 series.

First, when one of the wireless communication device 100 and the wireless communication device 200 comes close to the other, the wireless communication device 100 provides the wireless communication device 200 with connection information for wireless LAN communication (for example, an SSID, a PSK, and the like), an IP address and service information through NFC (S501).

Next, the wireless communication device 100 and the wireless communication device 200 exchanges a probe request and a probe response through wireless LAN communication (S503). To be specific, the wireless communication device 200 performs scanning using channel X represented by channel information, and then transmits the probe request to the wireless communication device 100 when receiving a beacon. Then, the wireless communication device 100 transmits the probe response to the wireless communication device 200.

Then, the wireless communication device 100 and the wireless communication device 200 establish a secure link in the wireless LAN communication (S505). In other words, the wireless communication device 100 and the wireless communication device 200 are securely connected to each other. Note that, when the secure link is established, 4-way handshaking is performed. In addition, the secure link is a link encrypted using the PSK (for example, a WPA2-PSK).

Then, provision and use of a service through the wireless LAN communication are started between the wireless communication device 100 and the wireless communication device 200 (S507).

According to the communication control process described above, assignment of an IP address shown in FIG. 2 (S37) is omitted as the IP address is provided through NFC. In addition, service discovery as shown in FIG. 2 (S39) is omitted as the service information is provided through NFC. For this reason, provision or use of the service through wireless LAN communication can be started more quickly.

After the establishment of the secure link (S505), the wireless communication device 100 and the wireless communication device 200 transmit or receive image information, dynamic image information, or music information (S507). To be more specific, the wireless communication device 100 transmits or receives image information, dynamic image information, or music information (S507) without receiving a service discovery response including an IP address after the establishment of the secure link (S505). In addition, the wireless communication device 200 transmits or receives image information, dynamic image information, or music information (S507) without transmitting a service discovery request or a service discovery response including an IP address after the establishment of the secure link (S505). When transmitting or receiving image information, dynamic image information, or music information, the wireless communication device 100 and the wireless communication device 200 use the IP address provided through NFC (S501). In addition, the wireless communication device 100 and the wireless communication device 200 perform communication using the IP address (S507) regardless of whether there is a manipulation input from the user after the establishment of the secure link (S505).

Second Example

FIG. 8 is a sequence diagram showing a second example of the schematic flow of the communication control process according to the first embodiment. The second example is of the flow of a process relating to DLNA or Miracast.

As a premise, the wireless communication device 100 operates as a P2P group owner (P2P GO) of Wi-Fi Direct, and the wireless communication device 200 operates as a P2P device. The P2P device is in a state in which it is neither a P2P group owner nor a P2P client.

First, when one of the wireless communication device 100 and the wireless communication device 200 comes close to the other, the wireless communication device 100 provides the wireless communication device 200 with connection information for wireless LAN communication (for example, a P2P device address), an IP address and service information through NFC (S521).

Then, the wireless communication device 100 and the wireless communication device 200 perform provision discovery or invitation (S523).

Then, encryption key information is shared between the wireless communication device 100 and the wireless communication device 200 through WSC exchange (S525). Then, the wireless communication device 200 becomes a P2P client.

Then, the wireless communication device 100 and the wireless communication device 200 establish a secure link in wireless LAN communication (S527). In other words, the wireless communication device 100 and the wireless communication device 200 are securely connected to each other. Note that the secure link is a link encrypted using the PSK (for example, a WPA2-PSK).

Then, provision and use of a service through the wireless LAN communication is started between the wireless communication device 100 and the wireless communication device 200 (S529).

According to the communication control process described above, assignment of an IP address shown in FIG. 3 (S63) is omitted as the IP address is provided through NFC. In addition, at least a part of the device discovery (S53), service discovery (S55), and service negotiation (S65) shown in FIG. 3 is omitted as the service information is provided through NFC. For this reason, for example, provision or use of the service through wireless LAN communication can be started more quickly.

After the establishment of the secure link (S527), for example, the wireless communication device 100 and the wireless communication device 200 transmit or receive image information, dynamic image information or music information (S529). When transmitting or receiving the image information, dynamic image information or music information, the wireless communication device 100 and the wireless communication device 200 uses the IP address provided through NFC (S521). In addition, after the establishment of the secure link (S527), for example, the wireless communication device 100 and the wireless communication device 200 perform communication using the IP address (S529) regardless of whether there is a manipulation input from a user.

2.5. First Modified Example

Next, a first modified example of the first embodiment will be described with reference to FIGS. 9 to 11.

In the examples of the first embodiment described above, the wireless communication device 100 provides the other wireless communication device with additional information (for example, the IP address and/or the service information) together with the connection information through the short-range wireless communication.

On the other hand, in a first modified example of the first embodiment, when there is a predetermined restriction on an amount of data exchanged in the short-range wireless communication, the wireless communication device 100 does not provide such additional information along with the connection information through the short-range wireless communication. In other words, through the short-range wireless communication, the wireless communication device 100 provides the connection information, but does not provide such additional information. In addition, when there is no such predetermined restriction, the wireless communication device 100 provides the additional information together with the connection information.

(Wireless Communication Device 100: Information Providing Unit 163)

In the first modified example of the first embodiment, when there is a predetermined restriction on an amount of data exchanged in the short-range wireless communication, the information providing unit 163 does not provide additional information along with the connection information through the short-range wireless communication. In other words, the information providing unit 163 provides the connection information, but does not provide the additional information through the short-range wireless communication. On the other hand, when there is no such predetermined restriction, the information providing unit 163 provides the additional information together with the connection information through short-range wireless communication.

For example, the processing unit 160 (for example, the information providing unit 163 or another constituent component) determines whether or not there is such a predetermined restriction. Then, when it is determined that there is the predetermined restriction, the information providing unit 163 does not transmit the additional information to the other wireless communication device through the short-range wireless communication. On the other hand, when it is determined that there is no predetermined restriction, the information providing unit 163 provides the other wireless communication device with the additional information together with the connection information through the short-range wireless communication.

Additional Information

The additional information includes, for example, the IP address. In addition, the additional information includes, for example, the service information (in other words, information for use or provision of a service through the wireless communication).

Connection Information

In the first modified example, the connection information does not include, for example, the channel information (information representing a wireless channel used in connection with the wireless communication device 200) when there is the restriction, and includes the channel information when there is no restriction.

Predetermined Restriction

As the predetermined restriction on the amount of data, there can be various ones. Hereinbelow, a few examples of the predetermined restriction will be described. The amount of the data is, for example, an amount of data that can be transmitted in a predetermined period of time, or an amount of data that can be transmitted per unit time.

Size of an Antenna

As a first example, the predetermined restriction is that a size of antennas used for the short-range wireless communication of the wireless communication device 100 or the other wireless communication device (for example, the wireless communication device 200) is small. In other words, when the size of the antenna is small, the information providing unit 163 does not provide the additional information together with the connection information through the short-range wireless communication.

When the size of the antenna is small, for example, a communication trait can be degraded. For this reason, the amount of data exchanged in the short-range wireless communication is limited. Hereinbelow, a specific example with regard to this point will be described with reference to FIGS. 9 and 10.

FIG. 9 is an illustrative diagram for describing an example of a size of antennas for short-range wireless communication. Referring to FIG. 9, an NFC antenna 111 and another NFC antenna 211 are shown. The NFC antenna 111 is an example of implementation of the antenna unit 110 of the wireless communication device 100. The NFC antenna 211 is an example of implementation of the antenna unit 210 of the wireless communication device 200. In this example, both the NFC antenna 111 and the NFC antenna 211 are small. Thus, when slight shaking of a hand of a user moves the wireless communication device 100 and the wireless communication device 200, the NFC antenna 111 and NFC antenna 211 no longer face each other. For this reason, the communication trait of NFC is easily degraded, and an error quite easily occurs in NFC.

FIG. 10 is an illustrative diagram for describing another example of a size of the antennas for short-range wireless communication. Referring to FIG. 10, an NFC antenna 111 and another NFC antenna 211 are shown. In this example, the NFC antenna 111 is large, but the NFC antenna 211 is small. Also in this case, when slight shaking of a hand of a user moves the wireless communication device 100 and the wireless communication device 200, the NFC antenna 111 and NFC antenna 211 no longer face each other. For this reason, the communication trait of NFC is easily degraded. As a result, an error quite easily occurs in NFC.

As an example, the predetermined restriction is that a size of the antennas for the short-range wireless communication of both the wireless communication device 100 and the other wireless communication device (for example, the wireless communication device 200) is less than a predetermined size. In this case, the storage unit 150, for example, stores the size of the antennas of the wireless communication device 100 and the wireless communication device 200 for the short-range wireless communication. In addition, when at least one of the antennas has a size less than a predetermined size, it is determined that the predetermined restriction is present.

Note that the predetermined restriction may be that a size of the antenna of the wireless communication device 100 for the short-range wireless communication is less than a predetermined size. In this case, the storage unit 150 may store a size of the antenna of the wireless communication device 100 for the short-range wireless communication. Thus, when the size of the antenna is less than a predetermined size, it may be determined that the predetermined restriction is present.

Memory Capacity

As a second example, the predetermined restriction is a memory capacity of the wireless communication device 100 for the short-range wireless communication. In other words, when the memory capacity is small, the information providing unit 163 does not provide the additional information along with the connection information through the short-range wireless communication.

When, for example, the memory capacity is small, it is difficult to transmit a large amount of data through the short-range wireless communication at once. For this reason, the amount of data exchanged in the short-range wireless communication is limited.

As an example, the predetermined restriction is that a memory capacity of the wireless communication device 100 for the short-range wireless communication is less than a predetermined capacity. In this case, the storage unit 150 stores the memory capacity. Then, when the memory capacity is less than the predetermined capacity, it is determined that the predetermined restriction is present.

Other

As still another example, the predetermined restriction may be that an amount of data transmitted by the wireless communication device 100 in the short-range wireless communication (for example, an amount of data that can be transmitted in a predetermined period of time or per unit time) is small. As an example, the predetermined restriction may be that an amount of data is less than a predetermined amount. In this case, the storage unit 150 may store, for example, the amount of data. Then, when the amount of data is less than the predetermined amount, it may be determined that the predetermined restriction is present.

In addition, the predetermined restriction may be that a flag set according to an amount of data exchanged in the short-range wireless communication is a predetermined value (for example, 0). As an example, the predetermined value may be 0, the flag may be set to 0 when an amount of data transmitted by the wireless communication device 100 in the short-range wireless communication is small, and the flag may be set to 1 when it is not. In this case, the storage unit 150 stores, for example, the flag, and when the flag is set to the predetermined value, it may be determined that the predetermined restriction is present. Note that the flag may be set to a fixed value in the wireless communication device 100 (for example, when the device is manufactured), or may be automatically set by the wireless communication device 100.

(Flow of a Process)

FIG. 11 is a flowchart showing an example of the schematic flow of a process performed by the wireless communication device 100 according to the first modified example of the first embodiment.

First, it is determined whether or not there is a predetermined restriction on the amount of data exchanged in short-range wireless communication (S541).

When it is determined that there is the predetermined restriction (YES in S541), the information providing unit 163 provides connection information through the short-range wireless communication (S543). Note that the information providing unit 163 does not provide additional information through the short-range wireless communication. Then, the process ends.

On the other hand, when it is determined that there is no predetermined restriction (NO in S541), the information providing unit 163 provides connection information and additional information (for example, an IP address and/or service information) through the short-range wireless communication (S545). Then, the process ends.

Note that, when the additional information is provided (S545), the communication control process shown in FIG. 7 or FIG. 8 is performed. On the other hand, when the additional information is not provided (S543), for example, the communication control process shown in FIG. 2 or FIG. 3 is performed.

Hereinabove, the first modified example of the first embodiment has been described. According to the first modified example, a possibility of an error occurring in the short-range wireless communication (for example, NFC), for example, can be lowered. In addition, a time in which the wireless communication device 100 and the other wireless communication device (for example, the wireless communication device 200) are close to each other for the short-range wireless communication (for example, NFC) can be further shortened. As a result, usability for a user can be enhanced.

2.6. Second Modified Example

Next, a second modified example of the first embodiment will be described with reference to FIG. 12.

In the example of the first embodiment described above, the wireless communication device 100 provides the other wireless communication device with the service information (in other words, information for use or provision of a service through the wireless communication) together with the connection information through the short-range wireless communication.

On the other hand, in the second modified example of the first embodiment, the wireless communication device 100 provides identification information associated with the service information through the short-range wireless communication.

(Overall Mechanism)

First, a mechanism of issuance and provision of identification information associated with service information for use or provision of a service through the wireless communication will be described with reference to FIG. 12.

FIG. 12 is an illustrative diagram for describing the mechanism relating to identification information associated with service information. Referring to FIG. 12, the wireless communication device 100, the wireless communication device 200, a device of the manufacturer (hereinafter referred to as a "manufacturer device") 80 of the wireless communication device 100, and a managing device 90 that manages identification information and service information are shown.

The manufacturer device 80 requests issuance of identification information at the time of manufacturing of the wireless communication device 100, addition of a service of the wireless communication device 100, updating of a version of an OS (Operating System), and the like from the managing device 90. At this time, the manufacturer device 80 provides the managing device 90 with the manufacturer, product number, service information, and the like. Then, the managing device 90 issues identification information associated with the service information in response to the request. To be more specific, the identification information is associated with the service information in a database of the managing device 90, and the identification information is provided to the manufacturer device 80. As an example, the identification information functions as an index of the service information in the database. The identification information is, for example, written on a memory of the wireless communication device 100 at the time of manufacturing. In addition, the manufacturer device 80 provides the wireless communication device 100 with the identification information at the time of distribution of an updating program. Note that the identification information is stored in, for example, the storage unit 150 of the wireless communication device 100.

On the other hand, the wireless communication device 200 requests provision of the identification information and service information via, for example, a network (for example, a mobile communication network and the Internet) from the managing device 90. Then, the managing device 90 provides the wireless communication device 200 with the identification information and the service information. The request from the wireless communication device 200 may be made according to designation of a user of the wireless communication device 200, or may be automatically performed by the wireless communication device 200. When the request is made according to designation by the user, a device to which the identification information and service information are provided may be selected by the user. In this case, the wireless communication device 100 is selected, and identification information and service information with regard to the wireless communication device 100 can be provided. In addition, when the request is automatically made by the wireless communication device 200, a device to which the identification information and service information are provided may be selected by the wireless communication device 200. In this case, based on any piece of information with regard to the wireless communication device 100 (as an example, a purchase history of the wireless communication device 100 stored on the Internet, or the like), the wireless communication device 100 is selected, and identification information and service information of the wireless communication device 100 can be provided. Then, the identification information is stored in the wireless communication device 200 in association with the service information.

As described above, the wireless communication device 100 and the wireless communication device 200 share the identification information, and the wireless communication device 200 also has the service information associated with the identification information. Thus, if the wireless communication device 100 provides the wireless communication device 200 with the identification information, the wireless communication device 200 can acquire the service information.

Note that the mechanism described with reference to FIG. 12 is an example, and the identification information may be shared between the wireless communication device 100 and the wireless communication device 200, and the service information associated with the identification information may be stored in the wireless communication device 200 through a different mechanism. As an example, instead of the manufacturer device 80, the wireless communication device 100 may provide the managing device 90 with service information and the like, or the managing device 90 may provide the wireless communication device 100 with identification information. As another example, the wireless communication device 100 may provide the wireless communication device 200 with the identification information and service information through any kind of communication each time the identification information and service information are updated. As such, various mechanisms can be employed.

(Wireless Communication Device 100: Information Acquisition Unit 161)

Identification Information

In the second modified example, the information acquisition unit 161 acquires identification information associated with service information for use or provision of a service through the wireless communication (for example, wireless LAN communication).

For example, as described above, the manufacturer device 80 (or managing device 90) provides the wireless communication device 100 with the identification information, and the identification information is stored in the storage unit 150. For this reason, the information acquisition unit 161 acquires the identification information from the storage unit 150.

Service Information

The service information includes, for example, the specifying information (in other words, information for specifying the wireless communication device 100 and the service) as described above in the example of the first embodiment. The specifying information is, for example, of a device class and a service class.

In addition, in the second modified example, the service information includes, for example, control information used in control performed by the other wireless communication device for use or provision of the service.

As an example, the control information includes the access information (information that enables access to stored information stored by the wireless communication device 100 for use or provision of the service). The access information is, for example, URL information that enables access to information stored by the wireless communication device 100. As another example, the control information is information of a control command that the wireless communication device 100 can accept. As still another example, the control information is information representing capability of the wireless communication device 100 with regard to the service.

(Wireless Communication Device 100: Information Providing Unit 163)

Identification Information

In the second modified example, the information providing unit 163 provides the identification information along with the connection information through short-range wireless communication.

When, for example, one of the wireless communication device 100 and the other wireless communication device (for example, the wireless communication device 200) comes close to the other, the information providing unit 163 provides the other wireless communication device with the identification information along with the connection information via the short-range wireless communication unit 140.

(Wireless Communication Device 200: Information Acquisition Unit 261)

Identification Information

In the second modified example, the identification information is provided to the wireless communication device 200 by the wireless communication device 100 along with the connection information through short-range wireless communication. In this case, the information acquisition unit 261 acquires the identification information.

When, for example, one of the wireless communication device 100 and the wireless communication device 200 comes close to the other, the information acquisition unit 261 acquires the identification information provided along with the connection information by the wireless communication device 100 via the short-range wireless communication unit 240.

Note that the identification information is information that is provided to the wireless communication device 200 along with the service information and stored in the wireless communication device 200 in association with the service information. For example, the managing device 90 provides the wireless communication device 200 with the identification information and the service information of the wireless communication device 100 in response to the request from the wireless communication device 200 (for example, the information acquisition unit 261, the control unit 263, or another constituent component). Then, the processing unit 260 (the information acquisition unit 261, the control unit 263, or another constituent component) stores the identification information and the service information in the database so that the identification information and the service information are associated with each other in the database of the wireless communication device 200. In addition, the processing unit 260 (for example, the information acquisition unit 261 or control unit 263) searches the database and acquires the service information using the identification information provided by the wireless communication device 100.

(Flow of a Process)

A communication control process according to a second modified example is the same as the communication control process described with reference to FIGS. 7 and 8 except that the wireless communication device 100 provides the wireless communication device 200 with the identification information instead of the service information and the wireless communication device 200 acquires the service information using the identification information.

Hereinabove, the second modified example of the first embodiment has been described. According to the second modified example, the wireless communication device 200, for example, can acquire various kinds of information for provision or use of a service (for example, specifying information, control information, and the like) in a very short period of time. For this reason, provision or use of the service through the wireless communication can be started more quickly.

In addition, for example, an amount of data transmitted through the short-range wireless communication (for example, NFC) decreases greatly. For this reason, a possibility of an error occurring can be lowered. In addition, for example, a time in which the wireless communication device 100 and the other wireless communication device (for example, the wireless communication device 200) are brought close to each other for the short-range wireless communication (for example, NFC) can be further shortened. As a result, usability for a user can be enhanced.

2.7. Third Modified Example

Next, a third modified example of the first embodiment will be described with reference to FIG. 13.

In the third modified example, the wireless communication device 100 or wireless communication device 200 displays a screen that includes information relating to a service to be provided regardless of whether there is a manipulation of a user after establishment of a secure link.

To be more specific, for example, the wireless communication device 100 provides the wireless communication device 200 with the connection information, the IP address, and the like through the short-range wireless communication (for example, NFC) as described above. Then, the secure link for the wireless communication (for example, wireless LAN communication) is established. Then, one of the wireless communication device 100 and the wireless communication device 200 provides the other device with information relating to a service to be provided. Then, the other device displays a screen that includes the information relating to the service to be provided. A specific example of this will be described with reference to FIG. 13 hereinbelow.

FIG. 13 is an illustrative diagram for describing an example of a screen displayed regardless of whether there is a manipulation of a user. Referring to FIG. 13, the wireless communication device 200 is shown. In this example, the wireless communication device 200 is a smartphone. When, for example, a user brings the wireless communication device 200 close to the wireless communication device 100, the wireless communication device 100 provides the wireless communication device 200 with connection information (for example, an SSID and a PSK) and an IP address through NFC. Then, the wireless communication device 200 displays a screen that includes text information of "NFC connecting." Then, a secure link between wireless communication device 100 and the wireless communication device 200 is established. Then, the wireless communication device 200 participates in a network (for example, a home network) that includes the wireless communication device 100 complying with UPnP (Universal Plug and Play) or DLNA (Digital Living Network Alliance). Then, the wireless communication device 100 provides information representing a media server, a media renderer, and a media player of the network and information representing information provided by the media server (for example, dynamic image information, image information, and music information). Then, the wireless communication device 200 displays a screen showing the media server, the media renderer, and the media player, and information provided by the media server regardless of whether there is a manipulation of a user. Note that the user can select, for example, the media server, the media renderer, and the media player displayed on the screen. In addition, the user can select, for example, information provided by the media server.

Accordingly, for example, an effort required for a user decreases. In addition, a time taken until provision and use of a service can be further shortened.

2.8. Fourth Modified Example

Next, a fourth modified example of the first embodiment will be described with reference to FIG. 14.

In the fourth modified example, when, for example, providing the wireless communication device 200 with the connection information through short-range wireless communication, the wireless communication device 100 provides the wireless communication device 200 with information representing an abnormality of the wireless communication device 100 (hereinafter referred to as "abnormality information"). In addition, when acquiring the connection information from the wireless communication device 100 through the short-range wireless communication, the wireless communication device 200 acquires the abnormality information from the wireless communication device 100. Then, the wireless communication device 200 displays a screen showing the abnormality of the wireless communication device 100. Hereinbelow, a specific example of this matter will be described with reference to FIG. 14.

FIG. 14 is an illustrative diagram for describing an example of display of the screen showing an abnormality of the wireless communication device. Referring to FIG. 14, the wireless communication device 200 is shown. In this example, the wireless communication device 200 is a smartphone, and the wireless communication device 100 is a speaker. In addition, in this example, there is assumed to be an abnormality in the wireless communication device 100. When, for example, a user brings the wireless communication device 200 close to the wireless communication device 100, the wireless communication device 100 provides the wireless communication device 200 with connection information (for example, an SSID and a PSK) and abnormality information through NFC. Then, the wireless communication device 200 displays a screen that includes text information "NFC connecting," and then a screen that includes text information, "Error. An abnormality is found in the speaker," based on the abnormality information. Accordingly, the user is aware that there is an abnormality in the wireless communication device 100 (speaker).

When there is an abnormality in the wireless communication device 100, for example, the wireless communication device 100 provides the abnormality information, and the wireless communication device 200 acquires the abnormality information. Then, the screen shown in FIG. 14 is displayed. On the other hand, when there is no abnormality in the wireless communication device 100, the wireless communication device 100 does not provide the abnormality information, and the wireless communication device 200 does not acquire the abnormality information. Then a secure link is established, and provision and use of a service are started.

With such provision and acquisition of abnormality information, for example, the user can be aware of an abnormality of the wireless communication device 100 even when the wireless communication device 100 does not have a display.

Note that, in the fourth modified example, information representing an abnormality of the wireless communication device 200 may be provided and acquired through the short-range wireless communication, instead of the information representing an abnormality of the wireless communication device 100. In other words, when the connection information is acquired from the wireless communication device 200, the wireless communication device 200 may provide the wireless communication device 100 with information representing an abnormality of the wireless communication device 200 through the short-range wireless communication. In addition, when the connection information is provided to the wireless communication device 200, the wireless communication device 100 may acquire information representing an abnormality of the wireless communication device 200 from the wireless communication device 200 through the short-range wireless communication. Then, the wireless communication device 100 may display a screen showing the abnormality of the wireless communication device 200. Accordingly, even when the wireless communication device 200 does not have a display, a user can be aware of the abnormality of the wireless communication device 200.

3. Second Embodiment

Next, a second embodiment of the present disclosure will be described with reference to FIGS. 15 to 18.

3.1. Schematic Configuration of a Communication System

First, a schematic configuration of a communication system 2 according to the second embodiment of the present disclosure will be described with reference to FIG. 15. FIG. 15 is an illustrative diagram showing an example of the schematic configuration of the communication system 2 according to the second embodiment. Referring to FIG. 15, the communication system 2 includes a wireless communication device 300 and a wireless communication device 400.

The wireless communication device 300 has the function of wireless communication according to a predetermined communication scheme, and performs the wireless communication via an antenna unit 310. The wireless communication is, for example, wireless LAN communication, and the predetermined communication scheme is, for example, a communication scheme using the IEEE 802.11 specification. The IEEE 802.11 specification is the specification of any of the IEEE 802.11 series. Alternatively, the predetermined communication scheme may be a communication scheme that uses another wireless LAN standard specification. In addition, the wireless communication device 400 also has the function of wireless communication according to the predetermined communication scheme, and performs the wireless communication via an antenna unit 410. The wireless communication device 300 and the wireless communication device 400 perform the wireless communication (for example, wireless LAN communication) with each other.

In addition, the wireless communication device 300 has the function of first short-range wireless communication, and thus performs the first short-range wireless communication via another antenna unit 330. For example, the first short-range wireless communication is near field communication (NFC). To be more specific, the first short-range wireless communication is NFC that complies with any of various standards, for example, ISO/IEC 14443 Type A, ISO/IEC 14443 Type B, ISO/IEC 15693, ISO/IEC 18092, ISO/IEC 21481, and the like. In addition, the wireless communication device 400 also has the function of the first short-range wireless communication, and thus performs the first short-range wireless communication via another antenna unit 430. The wireless communication device 300 and the wireless communication device 400 perform the first short-range wireless communication (for example, NFC) with each other.

In addition, the wireless communication device 300 has a function of second short-range wireless communication, and thus performs the second short-range wireless communication via still another antenna unit 350. The second short-range wireless communication is communication of which a communication distance is longer than the first short-range wireless communication (for example NFC). As an example, the second short-range wireless communication is communication using Bluetooth (a registered trademark) (hereinafter referred to as "Bluetooth communication"). In addition the wireless communication device 400 also has the function of the second short-range wireless communication, and thus performs the second short-range wireless communication via still another antenna unit 450. The wireless communication device 300 and the wireless communication device 400 perform the second short-range wireless communication (for example, Bluetooth communication) with each other.

3.2. Configuration of a First Wireless Communication Device

Next, an example of a configuration of the wireless communication device 300 according to the second embodiment will be described with reference to FIG. 16. FIG. 16 is a block diagram showing an example of the configuration of the wireless communication device 300 according to the second embodiment. Referring to FIG. 16, the wireless communication device 300 includes the antenna unit 310, a wireless communication unit 320, the antenna unit 330, a first short-range wireless communication unit 340, the antenna unit 350, a second short-range wireless communication unit 360, a storage unit 370, and a processing unit 380.

(Antenna Unit 310)

The antenna unit 310 releases signals output from the wireless communication unit 320 to a space as radio waves. In addition, the antenna unit 310 converts radio waves of a space into signals and then outputs the signals to the wireless communication unit 320.

(Wireless Communication Unit 320)

The wireless communication unit 320 performs the wireless communication according to the predetermined communication scheme. As described above, the wireless communication is, for example, the wireless LAN communication. The wireless communication unit 320, for example, transmits signals to the other wireless communication device via the antenna unit 310, and receives signals from the other wireless communication device via the antenna unit 310.

(Antenna Unit 330)

The antenna unit 330 releases signals output from the first short-range wireless communication unit 340 to a space as radio waves. In addition, the antenna unit 330 converts radio waves of a space into signals and then outputs the signals to the first short-range wireless communication unit 340.

(First Short-Range Wireless Communication Unit 340)

The first short-range wireless communication unit 340 performs the first short-range wireless communication. As described above, the first short-range wireless communication is, for example, NFC. The first short-range wireless communication unit 340, for example, transmits signals to the other wireless communication device via the antenna unit 330, and receives signals from the other wireless communication device via the antenna unit 330.

(Antenna Unit 350)

The antenna unit 350 releases signals output from the second short-range wireless communication unit 360 to a space as radio waves. In addition, the antenna unit 350 converts radio waves of a space into signals and then outputs the signals to the second short-range wireless communication unit 360.

(Second Short-Range Wireless Communication Unit 360)

The second short-range wireless communication unit 360 performs the second short-range wireless communication. As described above, the second short-range wireless communication is communication of which a communication distance is longer than the first short-range wireless communication (for example, NFC), and for example, is communication according to Bluetooth. The second short-range wireless communication unit 360, for example, transmits signals to the other wireless communication device via the antenna unit 350, and receives signals from the other wireless communication device via the antenna unit 350.

(Storage Unit 370)

The storage unit 370 temporarily or permanently stores programs and data used for operations of the wireless communication device 300.

(Processing Unit 380)

The processing unit 380 provides various functions of the wireless communication device 300. The processing unit 380 includes an information acquisition unit 381, an information providing unit 383, and a control unit 385.

(Information Acquisition Unit 381)

Connection Information, IP Address, and Service Information

The information acquisition unit 381 acquires connection information to be used for performing wireless communication with another wireless communication device according to a predetermined communication scheme. In addition, the information acquisition unit 381 acquires, for example, an IP address. In addition, the information acquisition unit 381 acquires, for example, service information for use or provision of a service through the wireless communication (for example, wireless LAN communication) according to the predetermined communication scheme. Description of these matters is the same as description relating to the information acquisition unit 161 according to the first embodiment except that the reference numeral thereof is different. Thus, overlapping description will be omitted.

Extra Connection Information

The information acquisition unit 381 acquires extra connection information to be used for performing the second short-range wireless communication with another wireless communication device. As described above, the second short-range wireless communication is communication of which a communication distance is longer than the first short-range wireless communication (for example, NFC), and for example, is communication according to Bluetooth (Bluetooth communication). The other wireless communication device is, for example, the wireless communication device 400.

The extra connection information includes identification information and an address of the wireless communication device 300. As an example, the second short-range wireless communication is Bluetooth communication, and the extra connection information includes a Bluetooth device address.

Note that the extra connection information may further include information representing a wireless channel used in connection with the wireless communication device 400 for the second short-range wireless communication.

(Information Providing Unit 383)

The information providing unit 383 provides the other wireless communication device with information through the first or second short-range wireless communication.

Extra Connection Information

The information providing unit 383 provides the other wireless communication device with the extra connection information through the first short-range wireless communication (for example, NFC).

When, for example, one of the wireless communication device 300 and the other wireless communication device (for example, the wireless communication device 400) comes close to the other, the information providing unit 383 provides the other wireless communication device with the extra connection information via the first short-range wireless communication unit 340.

Connection Information

The information providing unit 383 provides the other wireless communication device with the connection information (in other words, connection information used for performing wireless communication with the other wireless communication device according to a predetermined communication scheme) through the second short-range wireless communication.

For example, the wireless communication device 300 and the other wireless communication device (for example, the wireless communication device 400) are connected to each other through the second short-range wireless communication (for example, Bluetooth communication). Then, the information providing unit 383 provides the other wireless communication device with the connection information via the second short-range wireless communication unit 360.

IP Address and Service Information

The information providing unit 383 provides the other wireless communication device with, for example, the IP address through the second short-range wireless communication. In other words, the information providing unit 383 provides the other wireless communication device with the IP address and the connection information through the second short-range wireless communication. The other wireless communication device is, for example, the wireless communication device 400.

In addition, the information providing unit 383 further provides, for example, the service information (in other words, information for use or provision of a service through the wireless communication) through the second short-range wireless communication.

The wireless communication device 300 and the other wireless communication device (for example, the wireless communication device 400) are connected to each other through, for example, the second short-range wireless communication (for example, Bluetooth communication). Then, the information providing unit 383 also provides the other wireless communication device with the IP address and/or the service information along with the connection information via the second short-range wireless communication unit 360.

As described above, the information providing unit 383 provides additional information (for example, the IP address and/or the service information) along with the connection information through the second short-range wireless communication (for example, Bluetooth communication).

(Control Unit 385)

Connection Process

Second Short-Range Wireless Communication

The control unit 385 performs, for example, a connection process for performing the second short-range wireless communication (for example, Bluetooth communication).

Wireless Communication

In addition, the control unit 385 performs a connection process for performing, for example, the wireless communication (for example, wireless LAN communication). The connection process includes, for example, transmission of a probe request or a probe response via the wireless communication unit 320, establishment of a secure link, and the like.

Control of Communication with Another Wireless Communication Device, and Control for Provision or Use of a Service The control unit 385 controls, for example, communication with another wireless communication device connected to the wireless communication device 300. In addition, the control unit 385 performs control for, for example, provision or use of a service. Description of these matters is the same as description relating to the control unit 165 according to the first embodiment except that the reference numeral thereof is different. Thus, overlapping description will be omitted herein.

3.3. Configuration of a Second Wireless Communication Device

Next, an example of a configuration of the wireless communication device 400 according to the second embodiment will be described with reference to FIG. 17. FIG. 17 is a block diagram showing an example of the configuration of the wireless communication device 400 according to the second embodiment. Referring to FIG. 17, the wireless communication device 400 includes the antenna unit 410, a wireless communication unit 420, the antenna unit 430, a first short-range wireless communication unit 440, the antenna unit 450, a second short-range wireless communication unit 460, a storage unit 470, and a processing unit 480.

Note that description with regard to the antenna unit 410, the wireless communication unit 420, the antenna unit 430, the first short-range wireless communication unit 440, the antenna unit 450, the second short-range wireless communication unit 460, and the storage unit 470 is the same as description with regard to the antenna unit 310, the wireless communication unit 320, the antenna unit 330, the first short-range wireless communication unit 340, the antenna unit 350, the second short-range wireless communication unit 360, and the storage unit 370 of the wireless communication device 300 described above except that the reference numerals thereof are different. Thus, overlapping description will be omitted herein.

(Processing Unit 480)

The processing unit 480 provides various functions of the wireless communication device 400. The processing unit 480 includes an information acquisition unit 481 and a control unit 483.

(Information Acquisition Unit 481)

Extra Connection Information

The information acquisition unit 481 acquires extra connection information to be used for performing the second short-range wireless communication with the other wireless communication device from the other wireless communication device (for example, the wireless communication device 300) through the first short-range wireless communication (for example, NFC). As described above, the second short-range wireless communication is communication of which a communication distance is longer than the first short-range wireless communication (for example, NFC), and for example, is communication according to Bluetooth (Bluetooth communication).

The extra connection information includes identification information or an address of the other wireless communication device (the wireless communication device 300). As an example, the second short-range wireless communication is Bluetooth communication, and the extra connection information includes a Bluetooth device address.

When, for example, one of the other wireless communication device (the wireless communication device 300) and the wireless communication device 400 comes close to the other, the information acquisition unit 481 acquires the extra connection information provided by the wireless communication device 300 via the first short-range wireless communication unit 440.

Connection Information

The information acquisition unit 481 acquires connection information (in other words, connection information to be used for performing wireless communication with the other wireless communication device according to a predetermined communication scheme) from the other wireless communication device (for example, the wireless communication device 300) through the second short-range wireless communication (for example, Bluetooth communication).

When, for example, the other wireless communication device (the wireless communication device 300) and the wireless communication device 400 are connected to each other through the second short-range wireless communication (for example, Bluetooth communication), the information acquisition unit 481 acquires the connection information provided by the wireless communication device 300 via the second short-range wireless communication unit 460.

IP Address and Service Information

The information acquisition unit 481 acquires the IP address from the other wireless communication device (for example, the wireless communication device 300) through the second short-range wireless communication (for example, Bluetooth communication). In other words, the information acquisition unit 481 acquires the IP address and the connection information from the other wireless communication device through the second short-range wireless communication.

In addition, the information acquisition unit 481 further acquires, for example, the service information (in other words, information for use or provision of a service through the wireless communication) from the other wireless communication device (for example, the wireless communication device 300) through the second short-range wireless communication (for example, Bluetooth communication).

When, for example, the other wireless communication device (the wireless communication device 300) and the wireless communication device 400 are connected to each other through the second short-range wireless communication (for example, Bluetooth communication), the information acquisition unit 481 acquires the IP address and/or the service information provided along with the connection information by the wireless communication device 300 via the second short-range wireless communication unit 460.

(Control Unit 483)

Connection Process

Second Short-Range Wireless Communication

The control unit 483 performs, for example, a connection process for performing the second short-range wireless communication (for example, Bluetooth communication). For example, the control unit 483 performs the connection process using the extra connection information acquired by the information acquisition unit 481.

Wireless Communication

The control unit 483 performs a connection process for performing, for example, the wireless communication (for example, wireless LAN communication). Description of this matter is the same as description relating to the control unit 263 according to the first embodiment except that the reference numeral thereof is different. Thus, overlapping description will be omitted herein.

Control of Communication with Another Wireless Communication Device, and Control for Provision or Use of a Service The control unit 483 controls, for example, communication with another wireless communication device connected to the wireless communication device 400. In addition, the control unit 483 performs control for, for example, provision or use of a service. Description of these matters is the same as description relating to the control unit 263 according to the first embodiment except that the reference numeral thereof is different. Thus, overlapping description will be omitted herein.

3.4. Flow of a Process

Next, a communication control process according to the second embodiment will be described with reference to FIG. 18. The example described hereinbelow is an example in which the wireless communication is wireless LAN communication (also referred to as Wi-Fi communication), the first short-range wireless communication is NFC, and the second short-range wireless communication is Bluetooth communication.

FIG. 18 is a sequence diagram showing an example of the schematic flow of the communication control process according to the second embodiment.

As a premise, the wireless communication device 300 operates as an access point of the IEEE 802.11 series or a P2P group owner (P2P GO) of Wi-Fi Direct, and the wireless communication device 400 operates as a station of the IEEE 802.11 series.

First, when one of the wireless communication device 300 and the wireless communication device 400 comes close to the other, the wireless communication device 300 provides the wireless communication device 400 with connection information for Bluetooth communication (for example, a Bluetooth device address, and the like) through NFC (S601).

Then, the wireless communication device 300 and the wireless communication device 400 establish connection for Bluetooth communication (S603).

Then, the wireless communication device 300 provides the wireless communication device 400 with connection information for the wireless LAN communication (for example, an SSID, a PSK, and the like), an IP address, and service information through Bluetooth communication (S605).

Then, the wireless communication device 300 and the wireless communication device 400 establish a secure link for the wireless LAN communication (S607). In other words, the wireless communication device 300 and the wireless communication device 400 are securely connected to each other. Note that the secure link is a link encrypted using the PSK (for example a WPA2-PSK).

Then, provision and use of a service through the wireless LAN communication between the wireless communication device 300 and the wireless communication device 400 are started (S609).

According to the example of the second embodiment as above, even when an amount of data exchanged between the devices is large (for example, 2 to 4 kB or greater), for example, a time for which the wireless communication device 300 and the other wireless communication device (for example, the wireless communication device 400) are brought close to each other can be further shortened. In addition, provision or use of a service through the wireless communication, for example, can be started more quickly.

3.5. First Modified Example

When, for example, there is a predetermined restriction (in other words, a restriction on an amount of data exchanged in the first short-range wireless communication (for example, NFC)), the technique as in the example of the second embodiment described above may be used. In addition, when there is no predetermined restriction, the technique as in the first embodiment described above (in other words, the technique of providing the connection information and the like through the first short-range wireless communication (for example, NFC) without providing the connection information and the like through the second short-range wireless communication (for example, Bluetooth communication)) may be used.

3.6. Second Modified Example

For example, the first short-range wireless communication unit 340 of the wireless communication device 300 can be implemented by an NFC tag. In addition, when the NFC tag is a static tag with which it is not possible to dynamically receive connection information, the technique as in the example of the second embodiment described above may be used. Accordingly, for example, it is possible to avoid storing the connection information (for example, including the PSK) in the static tag. In addition, when the NFC tag is a dynamic tag with which connection information can be dynamically received, the technique as in the first embodiment (in other words, the technique of providing the connection information and the like through the first short-range wireless communication (for example, NFC) without providing the connection information and the like through the second short-range wireless communication (for example, Bluetooth communication)) may be used.

4. Application Example

The technology according to the disclosure can be applied to various products. For example, the wireless communication devices 100, 200, 300, and 400 may be realized as mobile terminals such as smartphones, tablet PCs (Personal Computers), notebook PCs, portable game terminals, or digital cameras, fixed-type terminals such as television receivers, printers, digital scanners, or network storages, or car-mounted terminals such as car navigation devices. In addition, the wireless communication devices 100, 200, 300, and 400 may be realized as terminals that perform M2M (Machine to Machine) communication (also referred to as MTC (Machine Type Communication) terminals) such as smart meters, vending machines, remotely controlled surveillance devices, or POS (Point Of Sale) terminals. Furthermore, the wireless communication devices 100, 200, 300, and 400 may be wireless communication modules mounted in such terminals (for example, integrated circuit modules configured by one die).

4.1. First Application Example

FIG. 19 is a block diagram showing an example of a schematic configuration of a smartphone 900 to which the technology of the present disclosure can be applied. The smartphone 900 includes a processor 901, a memory 902, a storage 903, an externally connected interface 904, a camera 906, a sensor 907, a microphone 908, a input device 909, a display device 910, a speaker 911, a wireless communication interface 912, an antenna switch 913, an antenna 914, an NFC interface 915, another antenna 916, a bus 917, a battery 918, and an auxiliary controller 919.

The processor 901 may be, for example, a CPU (Central Processing Unit) or an SoC (System on Chip), and controls functions of an application layer and other layers of the smartphone 900. The memory 902 includes a RAM (Random Access Memory) and a ROM (Read Only Memory), and stores programs executed by the processor 901 and data. The storage 903 can include a storage medium such as a semiconductor memory or a hard disk. The externally connected interface 904 is an interface for connecting an externally attached device such as a memory card or a USB (Universal Serial Bus) device to the smartphone 900.

The camera 906 has an image sensor, for example, a CCD (Charge Coupled Device) or a CMOS (Complementary Metal Oxide Semiconductor), to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like, to receive manipulations or information inputs from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 912 supports one or more wireless LAN standards of IEEE 802.11, to be more specific, IEEE 802.11a, 11b, 11g, 11n, 11ac, and 11ad, to execute the wireless LAN communication. The wireless communication interface 912 can communicate with another device via a wireless LAN access point in an infrastructure mode. In addition, the wireless communication interface 912 can directly communicate with another device in a direct communication mode (or an ad hoc mode). The wireless communication interface 912 can typically include a baseband processor, an RF (Radio Frequency) circuit, a power amplifier, and the like. The wireless communication interface 912 may be a single-chip module on which a memory that stores a communication control program, a processor that executes the program, and a relevant circuit are integrated. The wireless communication interface 912 may support another kind of wireless communication scheme such as a cellular communication scheme in addition to the wireless LAN scheme. The antenna switch 913 switches a connection destination of the antenna 914 for a plurality of circuits (for example, circuits for different wireless communication schemes) included in the wireless communication interface 912. The antenna 914 has a single or a plurality of antenna elements (for example, a plurality of antenna elements constituting a MIMO antenna), and is used for transmission and reception of wireless signals from the wireless communication interface 912.

The NFC interface 915 supports one or more NFC standards such as ISO/IEC 14443 Type A, ISO/IEC 14443 Type B, ISO/IEC 15693, ISO/IEC 18092, ISO/IEC 21481, and the like to execute NFC. The NFC interface 915 can typically include a baseband processor, an RF circuit, a power amplifier, and the like. The NFC interface 915 may be a single-chip module on which a memory that stores a communication control program, a processor that executes the program, and a relevant circuit are integrated. The antenna 916 is used for transmission and reception of wireless signals from the NFC interface 915.

Note that the smartphone 900 may include a plurality of antennas (for example, antennas for the cellular communication scheme, or the like), without being limited to the example of FIG. 19. In this case, the antenna switch 913 may be omitted from the configuration of the smartphone 900. In addition, the smartphone 900 may further include a Bluetooth interface.

The bus 917 connects the processor 901, the memory 902, the storage 903, the externally connected interface 904, the camera 906, the sensor 907, the microphone 908, the input device 909, the display device 910, the speaker 911, the wireless communication interface 912, the NFC interface 915, and the auxiliary controller 919 to one another. The battery 918 supplies electric power to each of the blocks of the smartphone 900 shown in FIG. 19 via power supply lines partially indicated by dashed lines in the drawing. The auxiliary controller 919 causes, for example, required minimum functions of the smartphone 900 to be operated in a sleep mode.

In the smartphone 900 shown in FIG. 19, the information acquisition unit 161, the information providing unit 163, and the control unit 165 described with reference to FIG. 5, and the information acquisition unit 381, the information providing unit 383, and the control unit 385 described with reference to FIG. 16 may be implemented in the processor 901 or the auxiliary controller 919. To be more specific, the functions may be implemented as, for example, programs (for example, a part of an OS (Operating System) or a device driver) executed by the processor 901 or the auxiliary controller 919. In addition, at least some of the functions may be implemented in the wireless communication interface 912, the NFC interface 915, or the Bluetooth interface.

In addition, in the smartphone 900 shown in FIG. 19, the information acquisition unit 261 and the control unit 263 described with reference to FIG. 6, and the information acquisition unit 481 and the control unit 483 described with reference to FIG. 17 may be implemented in the processor 901 or the auxiliary controller 919. To be more specific, the functions may be implemented as, for example, programs (for example, a part of an OS or a device driver) executed by the processor 901 or the auxiliary controller 919. In addition, at least some of the functions may be implemented in the wireless communication interface 912, the NFC interface 915, or the Bluetooth interface.

Note that the smartphone 900 may operate as a wireless access point (software AP) as the processor 901 executes the function of an access point at an application level. In addition, the wireless communication interface 912 may have the function of a wireless access point.

4.2. Second Application Example

FIG. 20 is a block diagram showing an example of a schematic configuration of a car navigation device 920 to which the technology of the present disclosure can be applied. The car navigation device 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, an antenna switch 934, an antenna 935, an NFC interface 936, another antenna 937, and a battery 938.

The processor 921 may be, for example, a CPU or an SoC controlling a navigation function and other functions of the car navigation device 920. The memory 922 includes a RAM and a ROM storing programs executed by the processor 921 and data.

The GPS module 924 measures a position of the car navigation device 920 (for example, latitude, longitude, and altitude) using GPS signals received from a GPS satellite. The sensor 925 can include a sensor group including, for example, a gyro sensor, a geomagnetic sensor, a pneumatic sensor, and the like. The data interface 926 is connected to a car-mounted network 941 via, for example, a terminal that is not illustrated to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive manipulations or information inputs from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of the IEEE 802.11, to be more specific, IEEE 802.11a, 11b, 11g, 11n, 11ac, and 11ad, to execute wireless LAN communication. The wireless communication interface 933 can communicate with another device via a wireless LAN access point in the infrastructure mode. In addition, the wireless communication interface 933 can directly communicate with another device in the direct communication mode (or the ad hoc mode). The wireless communication interface 933 can typically have a baseband processor, an RF circuit, a power amplifier, and the like. The wireless communication interface 933 may be a single-chip module on which a memory that stores a communication control program, a processor that executes the program, and a relevant circuit are integrated. The wireless communication interface 933 may support another kind of wireless communication scheme such as the cellular communication scheme in addition to the wireless LAN scheme. The antenna switch 934 switches a connection destination of the antenna 935 for a plurality of circuits included in the wireless communication interface 933. The antenna 935 has a single or a plurality of antenna elements and is used for transmission and reception of wireless signals from the wireless communication interface 933.

The NFC interface 936 supports one or more NFC standards such as ISO/IEC 14443 Type A, ISO/IEC 14443 Type B, ISO/IEC 15693, ISO/IEC 18092, ISO/IEC 21481, and the like to execute NFC. The NFC interface 936 can typically include a baseband processor, an RF circuit, a power amplifier, and the like. The NFC interface 936 may be a single-chip module on which a memory that stores a communication control program, a processor that executes the program, and a relevant circuit are integrated. The antenna 937 is used for transmission and reception of wireless signals from the NFC interface 936.

Note that the car navigation device 920 may include a plurality of antennas, without being limited to the example of FIG. 20. In this case, the antenna switch 934 may be omitted from the configuration of the car navigation device 920. In addition, the car navigation device 920 may further include a Bluetooth interface.

The battery 938 supplies electric power to each of the blocks of the car navigation device 920 shown in FIG. 20 via power supply lines partially indicated by dashed lines in the drawing. In addition, the battery 938 accumulates electric power supplied from the vehicle.

In the car navigation device 920 shown in FIG. 20, the information acquisition unit 161, the information providing unit 163, and the control unit 165 described with reference to FIG. 5, and the information acquisition unit 381, the information providing unit 383, and the control unit 385 described with reference to FIG. 16 may be implemented in the processor 921. To be more specific, the functions may be implemented as, for example, programs (for example, a part of an OS (Operating System) or a device driver) executed by the processor 921. In addition, at least some of the functions may be implemented in the wireless communication interface 933, the NFC interface 936, or the Bluetooth interface.

In addition, in the car navigation device 920 shown in FIG. 20, the information acquisition unit 261 and the control unit 263 described with reference to FIG. 6, and the information acquisition unit 481 and the control unit 483 described with reference to FIG. 17 may be implemented in the processor 921. To be more specific, the functions may be implemented as, for example, programs (for example, a part of an OS or a device driver) executed by the processor 921. In addition, at least some of the functions may be implemented in the wireless communication interface 933, the NFC interface 936, or the Bluetooth interface.

In addition, the technique of the present disclosure may be realized as a car-mounted system (for a vehicle) 940 that includes one or more blocks of the car navigation device 920 described above, the car-mounted network 941, and a vehicle-side module 942. The vehicle-side module 942 generates vehicle-side data such as a car speed, an engine speed, or malfunction information, and then outputs the generated data to the car-mounted network 941.

4.3. Third Application Example

FIG. 21 is a block diagram showing an example of a schematic configuration of a wireless communication module 960 to which the technology of the present disclosure can be applied. The wireless communication module 960 has a processor 961, a memory 962, a storage 963, a connection interface 964, a wireless communication interface 965, an NFC interface 966, and a bus 967.

The processor 961 may be, for example, a CPU controlling functions of the wireless communication module 960. The memory 962 includes a RAM and a ROM storing programs executed by the processor 961 and data. The storage 963 can include a storage medium such as a semiconductor memory or a hard disk. The connection interface 964 is an interface for connection with a terminal on which the wireless communication module 960 is mounted.

The wireless communication interface 965 supports one or more wireless LAN standards of the IEEE 802.11, to be more specific, IEEE 802.11a, 11b, 11g, 11n, 11ac, and 11ad, to execute wireless LAN communication. The wireless communication interface 965 can communicate with another device via a wireless LAN access point in the infrastructure mode. In addition, the wireless communication interface 965 can directly communicate with another device in the direct communication mode (or the ad hoc mode). The wireless communication interface 965 can typically include a baseband processor, an RF circuit, a power amplifier, and the like. The wireless communication interface 965 may be a single-chip module on which a memory that stores a communication control program, a processor that executes the program, and a relevant circuit are integrated. The wireless communication interface 965 may support another kind of wireless communication scheme such as the cellular communication scheme in addition to the wireless LAN scheme. Note that the wireless communication interface 965 transmits and receives wireless signals via an antenna. The antenna may be included in the terminal on which the wireless communication module 960 is mounted.

The NFC interface 966 supports one or more NFC standards such as ISO/IEC 14443 Type A, ISO/IEC 14443 Type B, ISO/IEC 15693, ISO/IEC 18092, ISO/IEC 21481, and the like to execute NFC. The NFC interface 966 can typically include a baseband processor, an RF circuit, a power amplifier, and the like. The NFC interface 966 may be a single-chip module on which a memory that stores a communication control program, a processor that executes the program, and a relevant circuit are integrated. Note that the NFC interface 966 transmits and receives wireless signals via an antenna. The antenna may be included in the terminal on which the wireless communication module 960 is mounted.

Note that the wireless communication module 960 may include one or more antennas (for example, an antenna of the wireless LAN communication scheme, an antenna of the NFC scheme, and the like) without being limited to the example of FIG. 21. In addition, the wireless communication module 960 may be a Bluetooth interface. In addition, one of or both the wireless communication interface 965 and the NFC interface 966 may be included in the terminal on which the wireless communication module 960 is mounted, rather than being included in the wireless communication module 960.

The bus 967 connects the processor 961, the memory 962, the storage 963, the connection interface 964, the wireless communication interface 965, and the NFC interface 966 to one another.

In the wireless communication module 960 shown in FIG. 21, the information acquisition unit 161, the information providing unit 163, and the control unit 165 described with reference to FIG. 5, and the information acquisition unit 381, the information providing unit 383, and the control unit 385 described with reference to FIG. 16 may be implemented in the processor 961. To be more specific, the functions may be implemented as, for example, programs executed by the processor 961. In addition, at least some of the functions may be implemented in the wireless communication interface 965, the NFC interface 966, or the Bluetooth interface.

In addition, in the wireless communication module 960 shown in FIG. 21, the information acquisition unit 261 and the control unit 263 described with reference to FIG. 6, and the information acquisition unit 481 and the control unit 483 described with reference to FIG. 17 may be implemented in the processor 961. To be more specific, the functions may be implemented as, for example, programs executed by the processor 961. In addition, at least some of the functions may be implemented in the wireless communication interface 965, the NFC interface 966, or the Bluetooth interface.

5. Conclusion

So far, the wireless communication devices and each process according to the embodiments of the present disclosure have been described with reference to FIGS. 4 to 21.

According to the embodiments of the present disclosure, a wireless communication device (wireless communication device 100 or 300) includes an information providing unit (information providing unit 163 or 383) that provides the other wireless communication device with an IP address and connection information used for performing wireless communication with the other wireless communication device according to a predetermined communication scheme through short-range wireless communication.

Accordingly, for example, provision or use of a service through wireless communication can be started more quickly. To be more specific, since assignment of IP addresses performed after connection of the wireless communication device to the other wireless communication device is omitted, provision or use of the service can be started sooner.

In addition, according to the embodiments of the present disclosure, a wireless communication device (wireless communication device 200 or 400) includes an information acquisition unit (information acquisition unit 261 or 481) that acquires an IP address and connection information used for performing wireless communication with the other wireless communication device according to a predetermined communication scheme from the other wireless communication device through short-range wireless communication.

Accordingly, for example, provision or use of a service through wireless communication can be started more quickly. To be more specific, since assignment of IP addresses performed after connection of the wireless communication device to the other wireless communication device is omitted, provision or use of the service can be started sooner.

Hereinabove, the exemplary embodiments of the present disclosure have been described with reference to accompanying drawings, however, it is needless to say that the present disclosure is not limited thereto. It should be understood by those skilled in the art that various modifications, combinations, sub-combinations and alterations may occur depending on design requirements and other factors insofar as they are within the scope of the appended claims or the equivalents thereof.

For example, the example in which a wireless communication device performs short-range wireless communication and the short-range wireless communication is NFC has been described, however, the present disclosure is not limited only to a case in which the wireless communication device includes an NFC reader-writer. For example, the wireless communication device may have an NFC tag, instead of an NFC reader-writer. In this case, when the wireless communication device provides the other wireless communication device with information, information to be provided may be generated in the NFC tag. Accordingly, the information to be provided can be read by the other wireless communication device. As a result, the information to be provided may be provided to the other wireless communication device.

In addition, the example in which one wireless communication device provides the other wireless communication device with, for example, connection information and additional information (for example, an IP address and/or service information) through short-range wireless communication has been described, however, the present disclosure is not limited thereto. For example, the other wireless communication device may also provide the wireless communication device with any kind of information through the short-range wireless communication. For example, the other wireless communication device may provide the wireless communication device with service information with respect to the other wireless communication device through the short-range wireless communication. To be more specific, when being provided with the connection information by the wireless communication device through the short-range wireless communication, the other wireless communication device may provide the wireless communication device with service information through the short-range wireless communication. In such a case, the other wireless communication device may also include an information providing unit that provides the service information through the short-range wireless communication.

In addition, process steps in each process of the specification may not necessarily be executed in a time series manner in the order described in the flowcharts. For example, the process steps in the processes may be executed in an order different from the orders described in the flowcharts or sequence diagrams, or may be executed in a parallel manner.

In addition, in the hardware such as the CPU, the ROM, and the RAM included in the wireless communication device, a computer program for exhibiting the same functions as the constituent elements of the wireless communication device can also be created. In addition, a storage medium that stores the computer program may also be provided. In addition, an information processing device (for example, a processing circuit, or a chip) that includes memories that store the computer program (for example, a ROM and a RAM), and one or more processors that can execute the computer program (for example, a CPU, a DSP, and the like) may also be provided.

In addition, the effects disclosed in the specification are not invariably determinative, but descriptive or exemplary. In other words, the technology of the present disclosure can exhibit other effects that are obvious to those skilled in the art based on the present disclosure of the specification, along with or instead of the effects described above.

Additionally, the present technology may also be configured as below.

(1) An electronic device including:
circuitry configured to
transmit, via a first communication interface to another electronic device, an IP (Internet Protocol) address; and
communicate with the another electronic device via a second communication interface in accordance with the IP address.

(2) The electronic device of (1), wherein
the IP address is an IP address assigned to the another electronic device.

(3) The electronic device of any of (1) to (2), wherein
the circuitry is configured to transmit connection information to the another electronic device via the first communication interface.

(4) The electronic device of (3), wherein
the connection information includes at least one of a service set identifier (SSID) and a pre-shared key (PSK).

(5) The electronic device of any of (1) to (4), wherein
the circuitry is configured to transmit service information to the another electronic device via the first communication interface.

(6) The electronic device of any of (1) to (5), wherein
the circuitry is configured to receive a probe request from the another electronic device via the second communication interface.

(7) The electronic device of (6), wherein
the probe request is received after transmitting the IP address to the another electronic device via the first communication interface.

(8) The electronic device of any of (1) to (7), wherein
the circuitry is configured to establish a secure link with the another electronic device via the second communication interface after transmitting the IP address to the another electronic device via the first communication interface.

(9) The electronic device of (8), wherein
the circuitry is configured to establish the secure link with the another electronic device by performing 4-way handshaking with the another electronic device via the second communication interface.

(10) The electronic device of any of (8) to (9), wherein
the secure link is a link encrypted using a pre-shared key (PSK).

(11) The electronic device of (10), wherein
the secure link is a link encrypted using a Wi-Fi Protected Access II (WPA2) PSK.

(12) The electronic device of any of (8) to (11), wherein
the circuitry is configured to transmit or receive at least one of image information, dynamic image information and music information via the secure link.

(13) The electronic device of any of (1) to (12), wherein
the electronic device is configured to function as an access point (AP) in an 802.11 compliant wireless local area network (WLAN) environment.

(14) The electronic device of any of (1) to (13), wherein the circuitry is configured to transmit, to the another electronic device via the second communication interface, a peer-to-peer (P2P) address assigned to the another electronic device.

(15) The electronic device of any of (1) to (14), wherein the circuitry is configured to perform provision discovery or invitation with the another electronic device via the second communication interface after transmitting the IP address to the another electronic device via the first communication interface.

(16) The electronic device of any of (1) to (15), wherein the circuitry is configured to share encryption key information with the another electronic device via the second communication interface after transmitting the IP address to the another electronic device via the first communication interface.

(17) The electronic device of (16), wherein the encryption key information is transmitted according to Wi-Fi Simple Configuration (WSC) exchange.

(18) The electronic device of any of (1) to (17), wherein the electronic device is configured to operate as a peer-to-peer (P2P) group owner (GO) of Wi-Fi Direct.

(19) The electronic device of any of (1) to (18), wherein the first and second communication interfaces are wireless communication interfaces, and a communication range of the first communication interface is less than a communication range of the second communication interface.

(20) The electronic device of (19), wherein the electronic device includes the first and second communication interfaces.

(21) The electronic device of any of (1) to (20), wherein the first communication interface is a near field communication (NFC) interface.

(22) The electronic device of any of (1) to (21), wherein the second communication interface is a wireless local area network (WLAN) communication interface.

(23) The electronic device of any of (3) to (22), wherein the connection information includes address information corresponding to the electronic device.

(24) The electronic device of any of (3) to (23), wherein the connection information includes a service set identifier (SSID).

(25) The electronic device of any of (3) to (24), wherein the connection information includes information used in an encryption or decryption process.

(26) The electronic device of any of (3) to (25), wherein the connection information includes channel information representing a wireless channel used to communicate with the another electronic device via the second communication interface.

(27) The electronic device of any of (1) to (26), wherein the circuitry includes a processor and a memory configured to store a program that is executed by the processor.

(28) The electronic device of any of (1) to (27), wherein the electronic device is one of a smartphone, tablet Personal Computer (PC), notebook PC, portable game terminal, digital camera, television receiver, printer, digital scanner, network storage, car-mounted terminal, a smart meter, a vending machine, a remotely controlled surveillance device, and a Point of Sale (PoS) terminal.

(29) A non-transitory computer-readable medium including computer-program instructions, which when executed by an electronic device, cause the electronic device to:
transmit, via a first communication interface to another electronic device, an IP (Internet Protocol) address; and
communicate with the another electronic device via a second communication interface in accordance with the IP address.

(30) A method performed by an electronic device, the method including:
transmitting, via a first communication interface to another electronic device, an IP (Internet Protocol) address; and
communicating with the another electronic device via a second communication interface in accordance with the IP address.

(A01) A wireless communication device including:
a providing unit configured to provide, through short-range wireless communication, another wireless communication device with an IP address and connection information used for performing wireless communication with the other wireless communication device according to a predetermined communication scheme.

(A02) The wireless communication device according to (A01), wherein the predetermined communication scheme is a communication scheme that uses the IEEE 802.11 specification.

(A03) The wireless communication device according to (A01), wherein the connection information includes information used in an encryption process or a decryption process.

(A04) The wireless communication device according to (A01), wherein the connection information includes at least one of a PSK (Pre-Shared Key) and an SSID (Service Set Identifier).

(A05) The wireless communication device according to (A03), wherein, after a secure link with the other wireless communication device is established, image information, dynamic image information, or music information is transmitted or received.

(A06) The wireless communication device according to (A05), wherein, after the secure link with the other wireless communication device is established, the image information, the dynamic image information, or the music information is transmitted or received without receiving a service discovery response including an IP address.

(A07) The wireless communication device according to (A06), wherein the IP address is used when the image information, the dynamic image information, or the music information is transmitted or received.

(A08) The wireless communication device according to (A07), wherein the IP address is used in a network environment in which at least three or more communication devices are included.

(A09) The wireless communication device according to (A01), wherein, after a secure link with the other wireless communication device is established, communication is performed using the IP address regardless of whether there is a manipulation input of a user.

(A10) The wireless communication device according to (A01), wherein, through the short-range wireless communication, the providing unit further provides service information for use or provision of a service which is provided through the wireless communication.

(A11) The wireless communication device according to (A10), wherein the service information includes information for specifying the wireless communication device and the service.

(A12) The wireless communication device according to (A11), wherein the service information includes access information that enables access to information retained by the wireless communication device for use or provision of the service.

(A13) The wireless communication device according to (A01), wherein the providing unit further provides identification information associated with service information for use or provision of a service which is provided through the wireless communication.

(A14) The wireless communication device according to (A13), wherein the service information includes control information used in control performed by the other wireless communication device for use or provision of the service.

(A15) The wireless communication device according to (A01), wherein, when the connection information is provided to the other wireless communication device through the short-range wireless communication, information representing an abnormality of the other wireless communication device is acquired from the other wireless communication device, or information representing an abnormality of the wireless communication device is provided to the other wireless communication device.

(A16) The wireless communication device according to (A01), wherein the connection information further includes channel information representing a wireless channel used for connection with the other wireless communication device.

(A17) The wireless communication device according to (A01), wherein the providing unit does not provide additional information along with the connection information through the short-range wireless communication when there is a predetermined restriction on an amount of data exchanged in the short-range wireless communication, and provides the additional information along with the connection information through the short-range wireless communication when there is no predetermined restriction.

(A18) The wireless communication device according to (A01), wherein the short-range wireless communication is NFC (Near Field Communication).

(A19) A program executed by a processor included in a wireless communication device, including:

instructing provision of, through short-range wireless communication, an IP address and connection information used for performing wireless communication with another wireless communication device according to a predetermined communication scheme to the other wireless communication device.

(A20) A wireless communication method including:

providing, through short-range wireless communication, another wireless communication device with an IP address and connection information used for performing wireless communication with the other wireless communication device according to a predetermined communication scheme.

REFERENCE SIGNS LIST 1, 2 communication system
100, 300 wireless communication device
161, 381 information acquisition unit
163, 383 information providing unit
165, 385 control unit
200, 400 wireless communication device
261, 481 information acquisition unit
263, 483, control unit

The invention claimed is:

1. A first electronic device, comprising:
circuitry configured to:
transmit first connection information to a second electronic device via a near field communication (NFC) interface;
transmit, based on the first connection information, an Internet Protocol (IP) address to the second electronic device via a Bluetooth communication interface;
transmit service information to the second electronic device via the Bluetooth communication interface after the transmission of the IP address, wherein
the service information includes information that enables access to information stored in the first electronic device;
transmit an invitation request to the second electronic device via a wireless local area network (WLAN) communication interface after the transmission of the IP address;
receive an invitation response from the second electronic device based on the transmitted invitation request; and
communicate with the second electronic device via the WLAN communication interface based on each of the transmitted IP address, the reception of the invitation response, and the transmitted service information.

2. The first electronic device of claim 1, wherein the IP address is assigned to the second electronic device.

3. The first electronic device of claim 1, wherein the circuitry is further configured to transmit second connection information to the second electronic device via the Bluetooth communication interface.

4. The first electronic device of claim 3, wherein the second connection information includes at least one of a service set identifier (SSID) or a pre-shared key (PSK).

5. The first electronic device of claim 1, wherein the circuitry is further configured to receive a probe request from the second electronic device via the WLAN communication interface.

6. The first electronic device of claim 5, wherein the circuitry is further configured to receive the probe request after the transmission of the IP address.

7. The first electronic device of claim 1, wherein the circuitry is further configured to establish a secure link with the second electronic device via the WLAN communication interface after the transmission of the IP address.

8. The first electronic device of claim 7, wherein the circuitry is further configured to establish the secure link with the second electronic device based on a 4-way handshake with the second electronic device via the WLAN communication interface.

9. The first electronic device of claim 7, wherein the circuitry is further configured to encrypt the secure link based on a pre-shared key (PSK).

10. The first electronic device of claim 9, wherein the secure link is an encrypted link based on a Wi-Fi Protected Access II (WPA2) PSK.

11. The first electronic device of claim 7, wherein the circuitry is further configured to at least one of transmit or receive at least one of image information, dynamic image information or music information via the secure link.

12. The first electronic device of claim 1, wherein the first electronic device is configured to function as an access point (AP) in an 802.11 compliant wireless local area network (WLAN) environment.

13. The first electronic device of claim 1, wherein the circuitry is further configured to transmit, to the second electronic device via the WLAN communication interface, a peer-to-peer (P2P) address assigned to the second electronic device.

14. The first electronic device of claim 1, wherein the circuitry is further configured to receive a provision discovery request from the second electronic device after the transmission of the IP address.

15. The first electronic device of claim 1, wherein the circuitry is further configured to share encryption key information with the second electronic device via the WLAN communication interface after the transmission of the IP address.

16. The first electronic device of claim 15, wherein the circuitry is further configured to transmit the encryption key information based on Wi-Fi Simple Configuration (WSC) exchange.

17. The first electronic device of claim 1, wherein the first electronic device is configured to operate as a peer-to-peer (P2P) group owner (GO) of Wi-Fi Direct.

18. The first electronic device of claim 1, wherein
a first communication range of the NFC communication interface is less than a second communication range of the Bluetooth communication interface.

19. The first electronic device of claim 18, wherein the first electronic device includes each of the NFC communication interface, the Bluetooth communication interface, and the WLAN communication interface.

20. The first electronic device of claim 3, wherein each of the first connection information and the second connection information includes address information corresponding to the first electronic device.

21. The first electronic device of claim 3, wherein the second connection information includes a service set identifier (SSID).

22. The first electronic device of claim 3, wherein the second connection information includes information associated with at least one of an encryption or a decryption of at least one of a pre-shared key (PSK) or a Wi-Fi Protected Access II (WPA2) PSK.

23. The first electronic device of claim 3, wherein the connection information includes channel information that represents a wireless channel for the communication with the second electronic device via the WLAN communication interface.

24. The first electronic device of claim 1, wherein the circuitry includes a processor and a memory configured to store computer-executable instructions that are executed by the processor.

25. The first electronic device of claim 1, wherein the first electronic device is one of a smartphone, a tablet Personal Computer (PC), a notebook PC, a portable game terminal, a digital camera, a television receiver, a printer, a digital scanner, a network storage, a car-mounted terminal, a smart meter, a vending machine, a remotely controlled surveillance device, or a Point of Sale (PoS) terminal.

26. A non-transitory computer-readable medium having stored thereon computer-readable instructions, which when executed by a processor of a first electronic device, cause the processor to execute operations, the operations comprising:
transmitting first connection information to a second electronic device via a near field communication (NFC) interface;
transmitting, based on the first connection information, an Internet Protocol (IP) address to the second electronic device via a Bluetooth communication interface;
transmitting service information to the second electronic device via the Bluetooth communication interface after the transmission of the IP address, wherein
the service information includes information that enables access to information stored in the first electronic device;
transmitting an invitation request to the second electronic device via a wireless local area network (WLAN) communication interface after the transmission of the IP address;
receiving an invitation response from the second electronic device based on the transmitted invitation request; and
communicating with the second electronic device via the WLAN communication interface based on each of the transmitted IP address, the reception of the invitation response, and the transmitted service information.

27. A method, comprising:
in a first electronic device:
transmitting first connection information to a second electronic device via a near field communication (NFC) interface;
transmitting, based on the first connection information, an Internet Protocol (IP) address to the second electronic device via a Bluetooth communication interface;
transmitting service information to the second electronic device via the Bluetooth communication interface after the transmission of the IP address, wherein
the service information includes information that enables access to information stored in the first electronic device;
transmitting an invitation request to the second electronic device via a wireless local area network (WLAN) communication interface after the transmission of the IP address;
receiving an invitation response from the second electronic device based on the transmitted invitation request; and
communicating with the second electronic device via the WLAN communication interface based on each of the transmitted IP address, the reception of the invitation response, and the transmitted service information.

* * * * *